(12) United States Patent
Hayashi et al.

(10) Patent No.: US 6,193,376 B1
(45) Date of Patent: *Feb. 27, 2001

(54) DISPLAY APPARATUS

(75) Inventors: Kohtaro Hayashi, Toyonaka; Kenji Konno, Sakai; Shunta Takimoto, Nishinomiya; Yasumasa Sawai; Shigeru Sawamura, both of Sakai, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/259,134

(22) Filed: Feb. 26, 1999

(30) Foreign Application Priority Data

| Feb. 27, 1998 | (JP) | 10-046656 |
| Feb. 27, 1998 | (JP) | 10-047376 |
| Feb. 27, 1998 | (JP) | 10-047942 |
| Mar. 13, 1998 | (JP) | 10-063315 |

(51) Int. Cl.$^7$ .................... G03B 21/26; G03B 21/00; G02B 27/44; G02F 1/1335
(52) U.S. Cl. .................... 353/30; 353/31; 353/34; 353/37; 359/566; 359/567; 359/571; 359/574; 349/5; 349/7; 349/62
(58) Field of Search ................. 353/31, 34, 37; 359/566, 567, 571, 574; 349/5, 7, 62

(56) References Cited

U.S. PATENT DOCUMENTS

| 5,355,188 | * | 10/1994 | Biles et al. | 353/69 |
| 5,566,007 | * | 10/1996 | Ikeda et al. | 359/66 |
| 5,612,797 | * | 3/1997 | Clarke | 349/5 |
| 5,701,005 | * | 12/1997 | Meyers | 359/574 |
| 5,914,811 | * | 6/1999 | Chen et al. | 359/495 |
| 5,951,135 | * | 9/1999 | Bigelow et al. | 353/31 |

FOREIGN PATENT DOCUMENTS

| 63-292892 | 11/1988 | (JP) . |
| 8-334770 | 12/1996 | (JP) . |
| 9-068685 | 3/1997 | (JP) . |
| 9-101468 | 4/1997 | (JP) . |
| 9-105899 | 4/1997 | (JP) . |
| 9-113725 | 5/1997 | (JP) . |
| 9-113899 | 5/1997 | (JP) . |

* cited by examiner

*Primary Examiner*—Russell Adams
*Assistant Examiner*—Khaled Brown
(74) *Attorney, Agent, or Firm*—Sidley & Austin

(57) ABSTRACT

A display apparatus of the present invention includes: an illumination optical system for emitting illumination light; a reflective display panel divided into a plurality of pixels, illuminated by the illumination light from the illumination optical system, and selectively reflecting the incident illumination light pixel by pixel as projection light; a projection optical system for projecting image information the reflective display panel onto a projected surface by transmitting the projection light reflected at the reflective display panel; and a reflection angle converting optical system disposed ahead of the reflective display panel, changing the angle of incidence of the illumination light on the reflective display panel, and adjusting the sum of the angle of incidence of the illumination light on the reflective display panel and the angle of reflection of the projection light at the reflective display panel.

38 Claims, 18 Drawing Sheets

FNO=2.50

— d
--- SC

Y'=20.9

— DS
--- DM

Y'=20.9

FNO=2.50
— d
-- SC

Y'=20.9
— DS
---- DM

Y'=20.9

FNO=3.61
— d
---- SC

Y'=20.9
— DS
---- DM

Y'=20.9

FNO=3.49

Y'=20.9

Y'=20.9

DISPLAY APPARATUS

This application is based on applications Nos. H10-046656, H10-047376, H10-047942 and H10-063315 filed in Japan, the contents of which are hereby incorporated by reference.

BACKGROUND OF THE INVENTION

1. Field of the Invention

The present invention relates to a display apparatus using a reflective display panel.

2. Description of the Prior Art

Recently, attention has been given to a reflective liquid crystal display (LCD) having higher display efficiency than a transmissive LCD. The reflective LCD acting as a reflective display panel reflects illumination light incident on the surface thereof at a reflection angle substantially the same as the incidence angle but opposite thereto in sign so that the light exits therefrom as so-called projection light of regular reflection. Heretofore proposed display apparatuses using the reflective LCD include one in which the reflective LCD is illuminated from a direction substantially vertical to the surface thereof so that the projection light exits in the vertical direction and images are formed by passing the projection light through a projection optical system.

The structure of the conventional display apparatus is shown in FIG. 29. In the figure, reference numeral 101 represents a light source, reference numeral 102 represents a reflector coupled to the light source 101 and reflecting light from the light source 101 to condense it, reference numeral 103 represents an illumination optical system disposed ahead of the reflector 102 for uniformly illuminating a subsequently-described reflective LCD with efficiency, reference numeral 104 represents a polarization beam splitter, reference numeral 105 represents the reflective LCD, reference numeral 106 represents a projection optical system, and reference numeral 107 represents a screen.

As shown in the figure, illumination light emanating from the light source 101 and the reflector 102 passes through the illumination optical system 103 to be incident on the polarization beam splitter 104. Then, only an s-polarized luminous flux is reflected at the polarization beam splitter 104 to be vertically incident on the surface of the reflective LCD 105. The vertically incident illumination light is selectively converted into p-polarized light pixel by pixel by the reflective LCD 105 and is totally reflected. Of the projection light vertically totally reflected at the reflective LCD 105, only p-polarized light passes through the polarization beam splitter 104 to be imaged on the screen 107 by the projection optical system 106.

Another reflective display panel receiving attention is a digital micromirror device (DMD). The surface of the DMD is divided into a plurality of pixels each having a fine mirror (micromirror), for example, being square. The micromirror rotates about two opposite angles of the pixel so as to incline +/−10 degrees pixel by pixel. For example, the condition where the micromirror inclines +10 degrees is set as the ON condition and the condition in which the micromirror inclines −10 degrees is set as the OFF condition.

FIG. 30 is a perspective view showing a reflection image of a micromirror of the DMD. In the figure, reference numeral 111 represents a DMD acting as the reflective display panel, reference numeral 112a shown by the solid line represents the micromirror at a pixel of the DMD 111 which micromirror is in the ON condition, reference numeral 112b shown by the broken line represents the micromirror which is in the OFF condition, and reference numeral 113 represents a projection optical system disposed above the DMD 111 and forming images by transmitting subsequently-described projection light from the DMD 111.

As shown in the figure, the rotation axis ab of the micromirror 112a forms, as shown by the arrow e, an angle of 45 degrees to the short sides c or the long sides d of the rectangle constituted by the DMD 111. The display apparatus using the DMD 111 constitutes a non-illustrated illumination optical apparatus so that illumination light A51 is incident at an incidence angle of 20 degrees to the surface of the DMD 111 within a cross section vertical to the rotation axis ab, that is, within a surface forming another angle of 45 degrees to the short sides c or the long sides d as shown by the arrow f.

When reflected at the micromirror 112a being in the ON condition, the illumination light A51 becomes projection light B51 with a reflection angle of 0 degree to the surface of the DMD 111. When reflected at the micromirror 112b being in the OFF condition, the illumination light A51 becomes projection light B52 with a reflection angle of −40 degrees to the surface of the DMD 111. The projection optical system 113 forms images by use of only the projection light B51 which is a luminous flux with a reflection angle of 0 degree.

The sum of the incidence and reflection angles will be referred to as incidence-reflection angle characteristic and is defined as "incidence angle+reflection angle" with respect to the incidence and reflection angles expressed as angles with signs like the above. For panels exhibiting the regular reflection characteristic like the above-described reflective LCD, the "incidence angle+reflection angle"=0 degree. For pixels where the micromirror is in the ON condition in the above-described DMD, the "incidence angle+reflection angle"=20 degrees.

However, since the reflective LCD has the regular reflection characteristic that vertically incident illumination light is vertically reflected, in the arrangement as shown in FIG. 29, the illumination light and the projection light take substantially the same optical path in opposite directions, so that an element for separating the optical path of the illumination light and the optical path of the projection light, for example, the above-mentioned polarization beam splitter is necessarily provided. This requires a large glass block and the employment of multi-layer thin film processing. As a result, the cost increases.

The polarization beam splitter selects the luminous fluxes to be passed therethrough based on the direction of the polarization plane of the reflected light (projection light) from the reflective LCD. However, there are occasions when, because of disturbance of the polarization plane caused by nonuniformness in homogeneity in the glass block, unnecessary ray components are passed through the beam splitter to decrease the contrast. In order to facilitate the separation between the optical path of the illumination light and the optical path of the projection light, the reflective LCD is illuminated from a direction oblique to the surface thereof. However, in that case, the projection light exits in the opposite oblique direction because of the regular reflection characteristic, and it is extremely difficult to structure a projection optical system that forms excellent images being conjugate with the reflective LCD based on the projection light exiting in the oblique direction.

On the contrary, in the DMD, since reflection light vertical to the panel is obtained by causing illumination light with an incidence angle of 20 degrees to be incident on the surface of the DMD within a surface forming an angle of 45 degrees to the short or the long sides of the panel, the optical path of the illumination light and the optical path of the projection light can be separated, so that the problem that arises when the above-described reflective LCD is used is solved. However, the surface forming an angle of 45 degrees to the short or the long sides is substantially in a diagonal direction with respect to the panel of the DMD, and in the surface, the image height is largest viewed from the projection optical system. It is necessary to secure the lens back focal length (LB) of the projection optical system in accordance with the image height. Since the reflected light from the panel is in a vertical direction, it is necessary to fulfill predetermined conditions such that the projection optical system should be in telecentric condition. For these reasons, display apparatuses using the DMD are large in size.

SUMMARY OF THE INVENTION

In view of the above-described problems, an object of the present invention is to provide a compact and low-cost display apparatus using a reflective display panel.

To achieve the above-mentioned object, according to the present invention, a display apparatus is provided with the following: an illumination optical system for emitting illumination light; a reflective display panel divided into a plurality of pixels, illuminated by the illumination light from the illumination optical system, and selectively reflecting the incident illumination light pixel by pixel as projection light; a projection optical system for projecting image information on the reflective display panel onto a projected surface by transmitting the projection light reflected at the reflective display panel; and a reflection angle converting optical system disposed ahead of the reflective display panel, changing the angle of incidence of the illumination light on the reflective display panel, and adjusting the sum of the angle of incidence of the illumination light on the reflective display panel and the angle of reflection of the projection light at the reflective display panel.

Moreover, according to the present invention, a display apparatus is provided with the following: an illumination optical system for emitting illumination light; a plurality of reflective display panels each divided into a plurality of pixels, illuminated by the illumination light, and selectively reflecting the incident illumination light pixel by pixel as projection light; a color separating and synthesizing system for separating the illumination light from the illumination optical system into light rays of a plurality of colors to illuminate the reflective display panels corresponding to the colors, and synthesizing light rays reflected at the reflective display panels; a projection optical system for projecting image information on the reflective display panel onto a projected surface by transmitting the projection light reflected at the reflective display panel; and a reflection angle converting optical system disposed ahead of the plurality of reflective display panels, changing the angle of incidence of the illumination light on the reflective display panels, adjusting the sum of the angle of incidence of the illumination light on the reflective display panels and the angle of reflection of the projection light at the reflective display panels, and changing the angle of incidence of the illumination light so that the sum varies according to areas of the reflective display panels to be illuminated.

DESCRIPTION OF THE PREFERRED EMBODIMENTS

Hereinafter, embodiments of the present invention will be described with reference to the drawings.

<First Embodiment>

Figure 1:
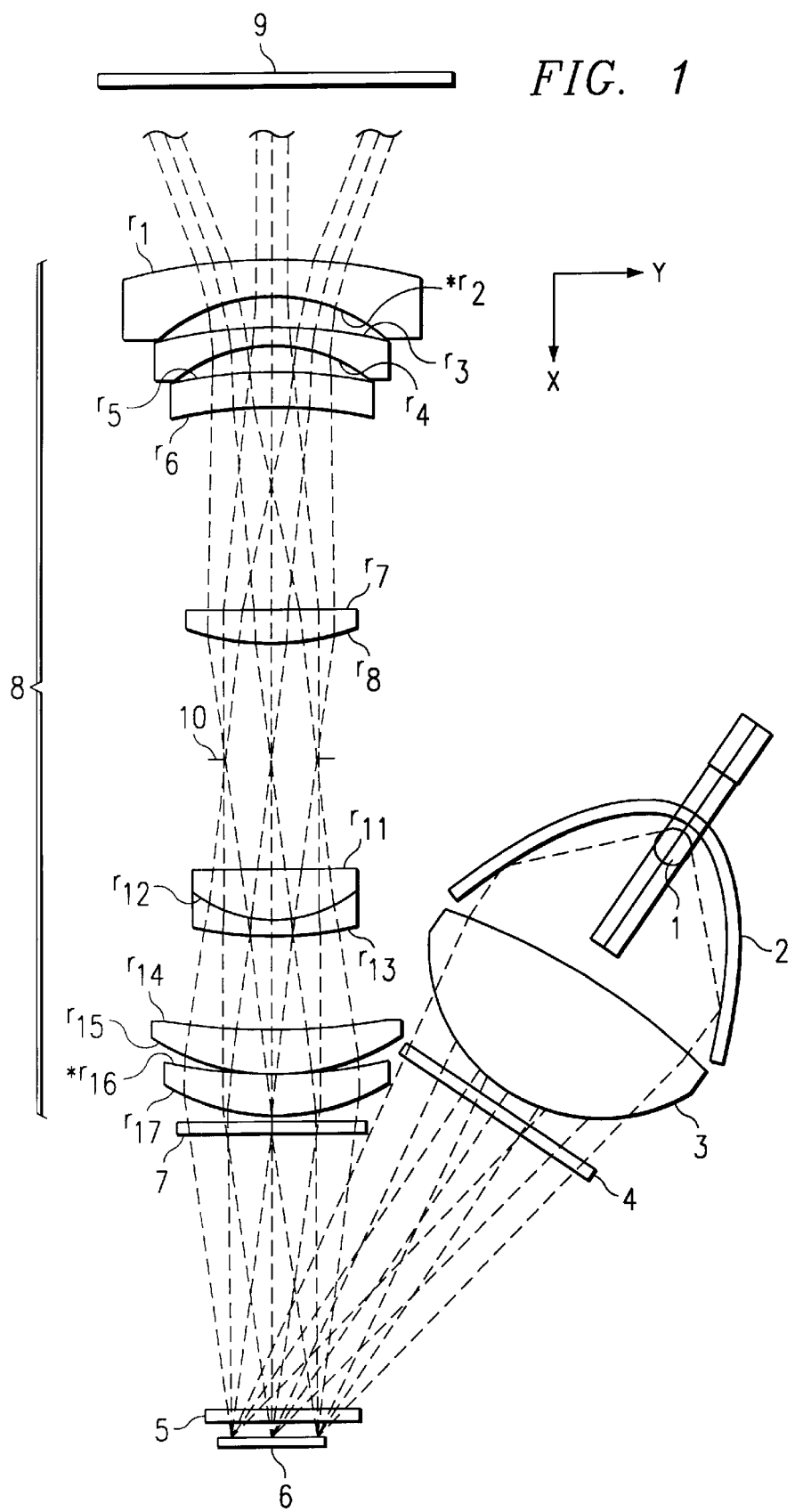
FIG. 1 is a longitudinal cross-sectional view showing the general structure of a display apparatus according to a first embodiment of the present invention.

FIG. 1 is a view showing the general structure of a display apparatus according to a first embodiment of the present invention. In the figure, reference numeral 1 represents a light source, reference numeral 2 represents a reflector of, for example, a parabolidal configuration disposed so as to surround the light source 1 and converting the light from the light source 1 into substantially parallel light, reference numeral 3 represents an illumination optical system disposed obliquely below the reflector 2 for uniformly illuminating a subsequently—described reflective LCD panel with efficiency, reference numeral 4 is an illumination-side polarizing plate disposed obliquely below the illumination optical system 3. The element designated 5 disposed ahead obliquely to the illumination-side polarizing plate 4 is a reflection angle converting optical system using a diffractive optical element (DOE). The element designated 6 disposed therebelow is the reflective liquid crystal display (LCD) panel acting as the reflective display panel.

The element designated 7 disposed above the reflection angle converting optical system 5 is a projection-side polarizing plate. The element designated 8 disposed thereabove is a projection optical system. The element designated 9 disposed thereabove is a screen. Reference numeral 10 represents a diaphragm provided in the projection optical system 8.

As shown in FIG. 1, illumination light comprising a mixture of direct light from the light source 1 and reflected light from the reflector 2 passes through the illumination optical system 3 and further passes through the illumination-side polarizing plate 4, where the luminous flux thereof is limited to a predetermined polarization plane. Then, the illumination light is incident on the reflection angle converting optical system 5. The behavior of the light at the optical system 5 will be described later in detail with reference to FIG. 2. The illumination light having passed through the reflection angle converting optical system 5 has its polarization plane selectively rotated 90 degrees pixel by pixel by the reflective LCD panel 6, or is reflected without it polarization plane being rotated. Then, the illumination light again passes through the reflection angle converting optical system 5 and is incident on the projection-side polarizing plate 7. Of the reflected light (projection light) from the reflective LCD panel 6, only the light whose polarization plane has been rotated 90 degrees passes through the projection-side polarizing plate 7. The projection light having passed through the projection-side polarizing plate 7 is imaged on the screen 9 by the projection optical system 8 which is a telecentric optical system.

While the illumination optical system 3 is shown as one convex lens element in FIG. 1, the use of an integrator using a lens array or a polarization converting optical system results in more efficient and uniform illumination. In the polarization converting optical system, luminous fluxes other than the luminous fluxes of a predetermined polarization plane necessary for liquid crystal are not discarded but are converted into a predetermined polarization plane and used for illumination.

Figure 2:
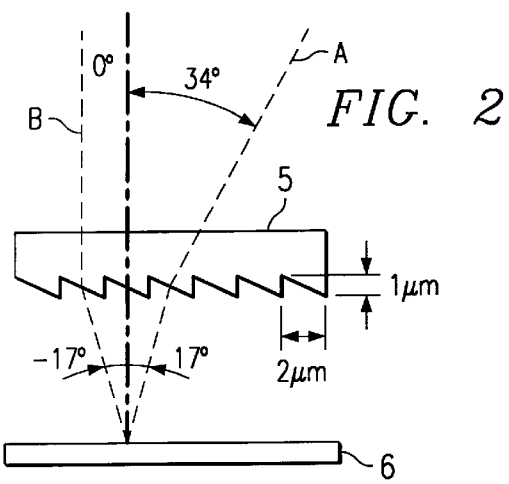
FIG. 2 is an optical path image view of a reflection angle converting optical system and a reflective LCD panel.

FIG. 2 is an optical path image view of the reflection angle converting optical system 5 and the reflective LCD panel 6. As shown in the figure, the reflection angle converting optical system 5 has a blazed (serrated) DOE on the surface on the side of the flat-panel reflective LCD panel 6 and is disposed close to the reflective LCD panel 6. The DOE is disposed on the panel side in order to reduce chromatic aberration due to diffraction by minimizing the distance between the DOE and the panel. In FIG. 2, for description, they are shown as being separated from each other.

Illumination light A incident on the reflection angle converting optical system 5 at an incidence angle of 34 degrees has the incidence angle thereof converted into 17 degrees by the optical system 5 and is then incident on the reflective LCD panel 6. The incident light is regularly reflected at the reflective LCD panel 6 and exits at a reflection angle of −17 degrees. The reflected light again passes through the reflection angle converting optical system 5 and exits as projection light B at a reflection angle of 0 degree, that is, in a direction vertical to the reflective LCD panel 6.

That is, projection light with a reflection angle of 0 degree to the illumination light with an incidence angle of 34 degrees exits from the reflective LCD panel 6 to which the reflection angle converting optical system 5 is added, and the sum of the incidence and reflection angles is 34 degrees. The sum of the incidence and reflection angles will be referred to as incidence-reflection angle characteristic and is defined as "incidence angle+reflection angle" with respect to the incidence and reflection angles expressed as angles with signs like the above. It is preferable that the sum of the incidence and reflection angles be within a range of 15 to 40 degrees. By the sum being within the range, size reduction of the optical system can be achieved. In the case of regular reflection, the sum is 0 degree.

Since the illumination light A illuminating the reflective LCD panel 6 at an angle of 34 degrees exits as the projection light B at an angle of 0 degree, the projection optical system 8 shown in FIG. 1 is a telecentric coaxial optical system. This arrangement makes it unnecessary to provide the conventionally-used means for separating the illumination light and the projection light such as a polarization beam splitter, so that the cost can be reduced.

The blazed DOE used for the reflection angle converting optical system 5 has, as shown in FIG. 2, a triangular configuration approximately with a pitch of 2 μm and a height of 1 μm. Construction data of the projection optical system of this embodiment are shown in Table 1. In the table, the surfaces marked with asterisks are aspherical, and aspherical coefficients and an expression representing an aspherical surface are also shown. The positional relationship among the elements of the optical system is expressed as three-dimensional coordinates represented, as shown in FIG. 1, by the X axis parallel to the plane of the figure and in the direction of the optical axis of the projection optical system 8, the Y axis perpendicular to the X axis and the Z axis perpendicular to the plane of the figure. This applies to FIGS. 4, 6, 9, 12, 16, 19 and 22.

Figure 3A:
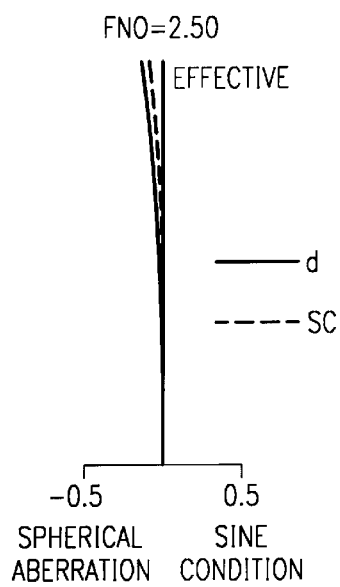
FIGS. 3A to 3C are graphic representations of aberrations of a projection optical system of the first embodiment.
Figure 3B:
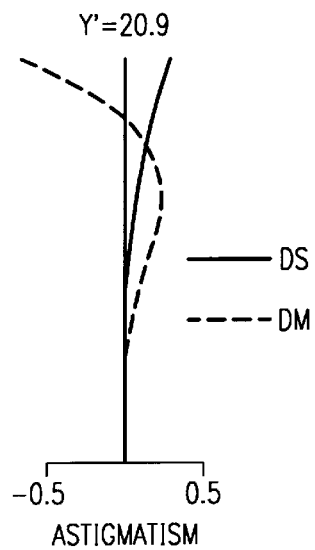
Figure 3C:
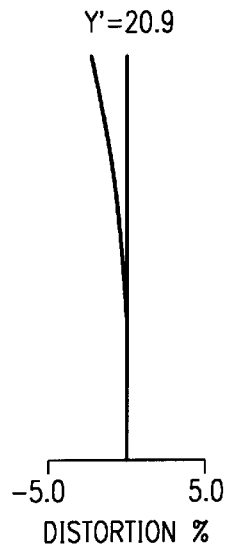

FIGS. 3A to 3C are graphic representations of aberrations of the projection optical system. In FIG. 3A showing spherical aberration, the solid line d represents spherical aberration to the d-line and the broken line SC represents sine condition. In FIG. 3B showing astigmatism, the solid line DS and the broken line DM represent astigmatisms of the sagittal luminous flux and the meridional luminous flux, respectively. In FIG. 3C, the solid line represents distortion. In this embodiment, in order to completely separate the optical path of the illumination light and the optical path of the projection light, the projection optical system requires a rather long lens back focal length, that is, a rather long distance between r17 shown in the table and the image plane. However, the present invention does not stick to this; the optical paths may be separated by use of a totally reflecting prism.

<Second Embodiment>

Figure 5:
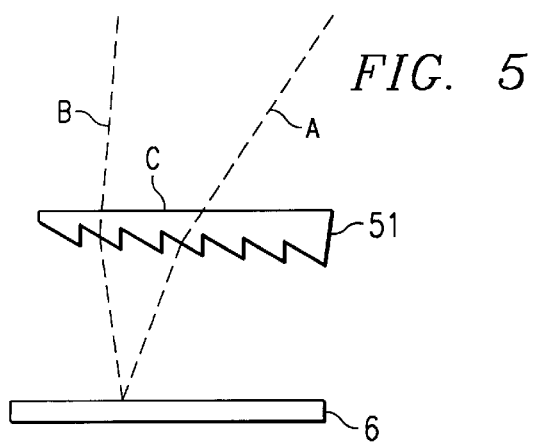
FIG. 5 is an optical path image view of a reflection angle converting optical system and a reflective LCD panel.
Figure 4:
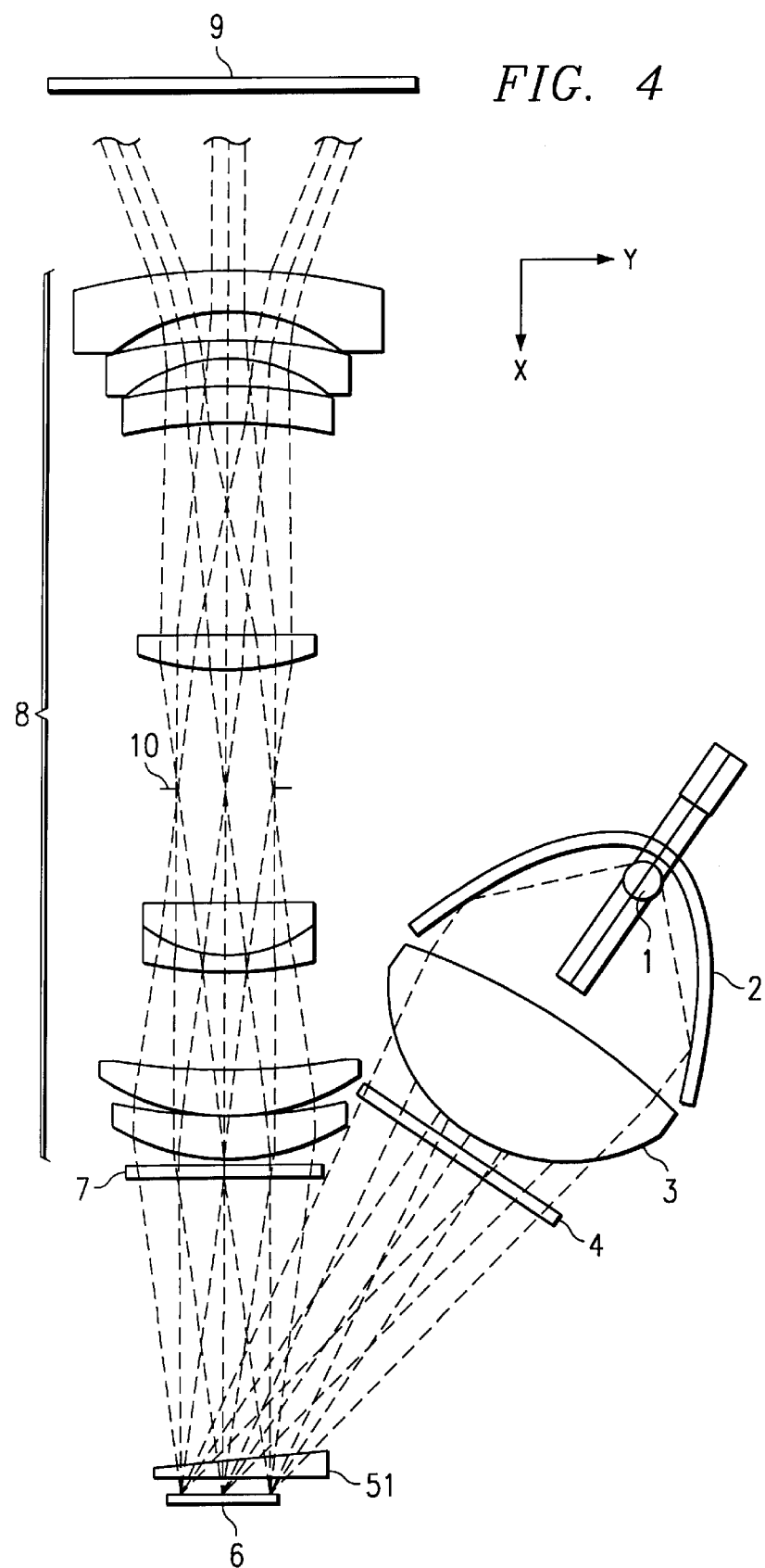
FIG. 4 is a longitudinal cross-sectional view showing the general structure of a display apparatus according to a second embodiment of the present invention.

FIG. 4 is a view showing the general structure of a display apparatus according to a second embodiment of the present invention. In this embodiment, a reflection angle converting optical system 51 being wedge-shaped and having a DOE on the panel side is used instead of the reflection angle converting optical system 5 used in the first embodiment. Except this, the arrangement of this embodiment is the same as that of the first embodiment shown in FIG. 1. FIG. 5 is an optical path image view of the reflection angle converting optical system 51 and the reflective LCD panel 6. As shown in the figure, the reflection angle converting optical system 51 has a blazed (serrated) DOE on the surface on the side of the flat-panel reflective LCD panel 6 and is disposed close to the reflective LCD panel 6. In FIG. 5, for description, they are shown as being separated.

The illumination light A incident on the reflection angle converting optical system 51 at a predetermined incidence angle has the incidence angle thereof converted by the optical system 51 and is then incident on the reflective LCD panel 6. The incident light is regularly reflected at the reflective LCD panel 6 and exits therefrom. The reflected light again passes through the reflection angle converting optical system 51, where the reflection angle thereof is converted. Then, the reflected light exits as the projection light B.

While in the first embodiment, the reflection angle converting optical system is flat and the surface not opposed to the reflective LCD panel does not make any particular contributions, in the second embodiment, an inclining weak wedge surface C of the reflection angle converting optical system 51 acts on the reflection angle conversion. When the reflection angle conversion is performed only by the DOE like in the first embodiment, chromatic aberration due to the DOE becomes slight lateral chromatic aberration, so that the lateral chromatic aberration appears as a slight color shift when the image on the reflective LCD panel is imaged through the projection optical system. In the second embodiment, the lateral chromatic aberration is reduced by the achromatic action of the weak wedge surface C and the DOE.

In order to restrain an inclination of the image plane caused by the use of the weak wedge surface in the reflection angle converting optical system, the reflective LCD panel 6 is slightly inclined from the vertical with respect to the direction of the optical axis of the projection optical system 8, that is, the direction of exit of the projection light B.

<Third Embodiment>

Figure 6:
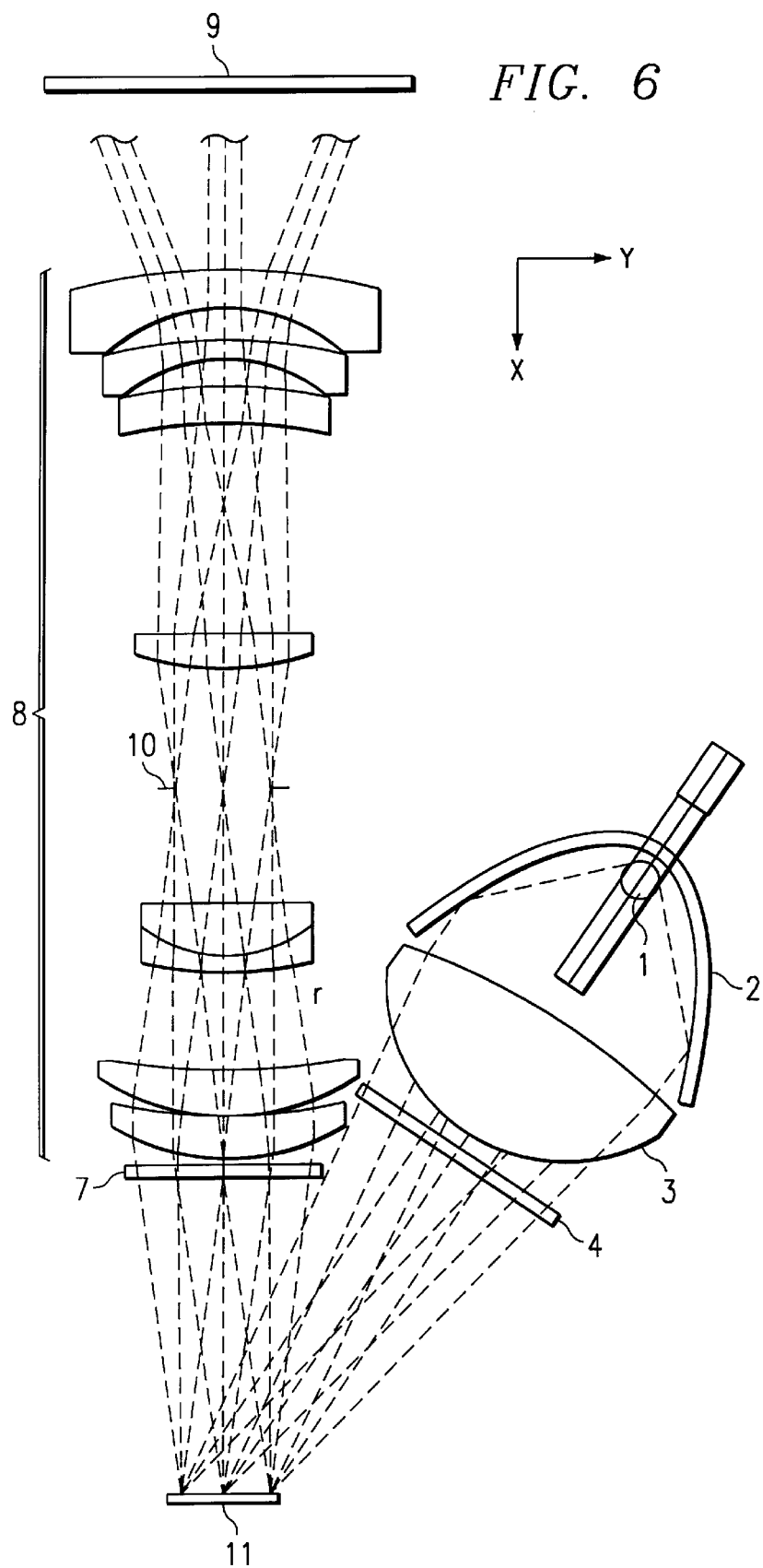
FIG. 6 is a longitudinal cross-sectional view showing the general structure of a display apparatus according to a third embodiment of the present invention.

FIG. 6 is a view showing the general structure of a display apparatus according to a third embodiment of the present invention. In the figure, reference numeral 11 represents a reflective LCD panel. In this embodiment, a reflection angle converting optical system having a reflective blazed DOE is incorporated in the reflecting surface of the reflective LCD panel 11. Except this, the arrangement of this embodiment is the same as that of the first embodiment.

Figure 7:
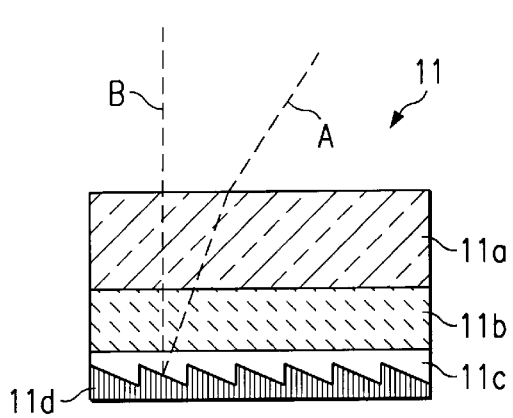
FIG. 7 is a longitudinal cross-sectional view of a reflective LCD panel incorporating a reflection angle converting optical system.

FIG. 7 is an enlarged view of a longitudinal cross section of the reflective LCD panel 11. As shown in the figure, cover glass 11a is provided on the surface of the panel and a liquid crystal layer 11b is provided therebelow. Below the layer 11b, a reflective blazed DOE 11d is incorporated with a projection layer 11c therebetween. The projection layer 11c is provided for making flat the surface being in contact with the liquid crystal. Because of this structure, the so-called incidence-reflection angle characteristic of the projection light B for the illumination light A is different from that of the case of regular reflection. It is necessary for the reflective blazed DOE used in the third embodiment to have a grating height of only approximately a quarter of that of the transmissive blazed DOE shown in the first and the second embodiments.

Figure 8:
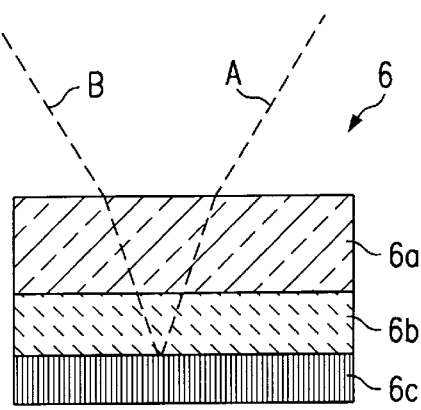
FIG. 8 is a longitudinal cross-sectional view of a normal reflective LCD panel.

In normal reflective LCD panels having no DOE, like in the reflective LCD panel 6 used in the first and the second embodiments, as shown in the enlarged cross-sectional view of FIG. 8, cover glass 6a is provided on the surface of the panel, a liquid crystal layer 6b is provided therebelow and a reflecting surface 6c serving also as a metal electrode is incorporated therebelow. The illumination light A is regularly reflected to become the projection light B. Therefore, a separated reflection angle converting optical system is necessary.

<Fourth Embodiment>

Figure 9:
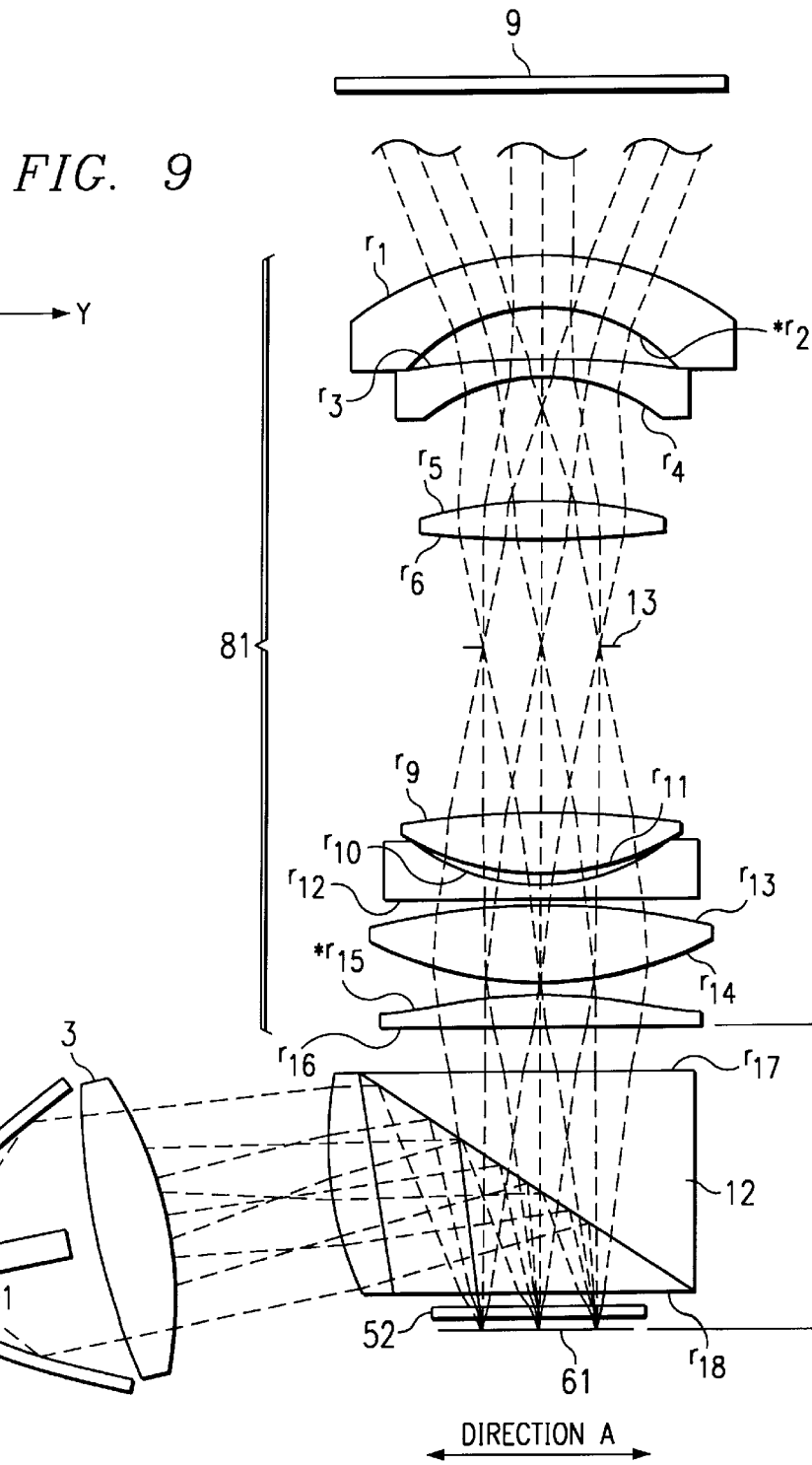
FIG. 9 is a longitudinal cross-sectional view showing the general structure of a display apparatus according to a fourth embodiment of the present invention.

FIG. 9 is a view showing the general structure of a display apparatus according to a fourth embodiment of the present invention. In the figure, reference numeral 1 represents a light source, reference numeral 2 represents a reflector disposed so as to surround the light source 1, reference numeral 3 represents an illumination optical system disposed at a side of the reflector 2 for uniformly illuminating a subsequently-described DMD with efficiency, reference numeral 12 represents a totally reflecting prism disposed ahead thereof for converting the optical path. The element designated 52 disposed below the totally reflecting prism 12 is a reflection angle converting optical system using a DOE. The element designated 61 disposed there below is the DMD.

Reference numeral 81 represents a projection optical system disposed above the totally reflecting prism 12 and forming images by transmitting subsequently-described projection light from the DMD 61. The element designated 9 disposed thereabove is a screen. Reference numeral 13 represents a diaphragm provided in the projection optical system 81.

As shown in FIG. 9, illumination light comprising a mixture of direct light from the light source 1 and reflected light from the reflector 2 passes through the illumination optical system 3 and is incident on the totally reflecting prism 12. The illumination light is totally reflected at the prism 12 and is then incident on the reflection angle converting optical system 52. The behavior of the light at the optical system 52 will be described later in detail with reference to FIG. 10A and 10B. The illumination light having passed through the reflection angle converting optical system 52 is obliquely incident on the surface of the DMD 61, is selectively reflected at the DMD 61 pixel by pixel according to a predetermined incidence-reflection angle characteristic and again passes through the reflection angle converting optical system 52. Then, only reflected light (projection light) of a specific incidence-reflection angle characteristic passes through the totally reflecting prism 12 and is incident on the projection optical system 81. The projection light passes therethrough to be imaged on the screen 9.

The direction A of FIG. 9 is the direction of the short sides of the DMD 61. The totally reflecting prism 12 for separating the illumination light and the projection light is not necessarily large-sized but may be small-sized. The lens back focal length (LB) of the projection optical system 81 represented by the dimension line is only 70% of that of the conventional arrangement in which the LCD panel is illuminated from the surface forming an angle of 45 degrees to the short or the long sides. When the display is ON, the DMD 61 reflects the incident light (illumination light) incident on the surface at an incidence angle of 20 degrees as reflected light (projection light) in a direction vertical to the surface within a surface forming an angle of 45 degrees to the short or the long sides of the panel of the DMD.

Figure 10A:
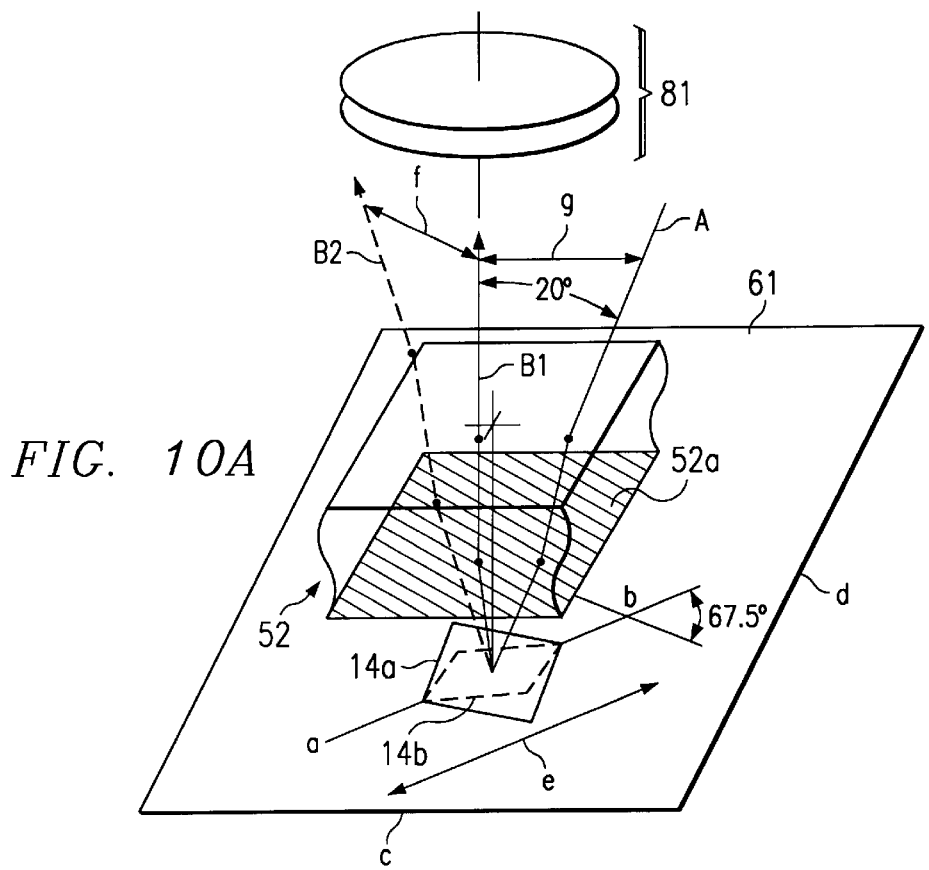
FIG. 10A is a perspective view schematically showing the relationship between a DMD and a reflection angle characteristic converting optical system.

FIG. 10A is a perspective view schematically showing the relationship between the micromirror of the DMD 61 and the reflection angle characteristic converting optical system 52 disposed immediately ahead of the DMD 61. In the figure, reference numeral 61 represents the DMD acting as the reflective display panel, reference numeral 14a shown by the solid line represents the micromirror at a pixel of the DMD 61 which micromirror is in the ON condition, reference numeral 14b shown by the broken line represents the micromirror which is in the OFF condition, and reference numeral 81 represents the projection optical system disposed above the reflection angle characteristic converting optical system 52 and forming images by transmitting subsequently-described projection light from the DMD 61. While the reflection angle characteristic converting optical system 52 is disposed so as to cover the entire surface of the DMD 61, only the portion necessary for description is shown.

As shown in FIG. 10A, the rotation axis ab of the micromirror 14a (14b) forms, as shown by the arrow e, an angle of 45 degrees to the short sides c or the long sides d of the rectangle constituted by the DMD 61. The micromirror 14a (14b) rotates about the rotation axis ab between two opposite angles so as to incline +10 degrees pixel by pixel. The condition where the micromirror inclines +10 degrees is set as the ON condition and the condition in which the micromirror inclines −10 degrees is set as the OFF condition. The reflected light (projection light) is directed toward the projection optical system 81 when the micromirror is in the ON condition.

The reflection angle characteristic converting optical system 52 has a transmissive DOE 52a. The direction of grooves of the DOE 52a forms, as shown in FIG. 10A, an angle of 67.5 degrees to the rotation axis ab of the micromirror. A display optical system using the DMD 61 constitutes an illumination optical apparatus comprising the light source 1, the reflector 2, the illumination optical system 3 and the totally reflecting prism 12 shown in FIG. 9 so that the illumination light A is incident on the reflection angle characteristic converting optical system 52 at an incidence angle of 20 degrees to the surface of the DMD 61 within a surface in the direction of the short sides c as shown by the arrow g.

The illumination light A is bent by the reflection angle characteristic converting optical system 52 and when reflected at the micromirror 14a being in the ON condition, the illumination light A becomes the projection light B1 with a reflection angle of 0 degree to the surface of the DMD 61. Then, the projection light B is directed to the projection optical system 81 in a direction vertical to the surface of the DMD 61. When reflected at the micromirror 14b being in the OFF condition, the illumination light A is directed like projection light B2 within a surface forming another angle of 45 degrees to the short sides c or the long sides d as shown by the arrow f, and is not input to the projection optical system 81. Then, the projection optical system 81 forms images by use of only projection light Bi which is a luminous flux with a reflection angle of 0 degrees.

Figure 10B:
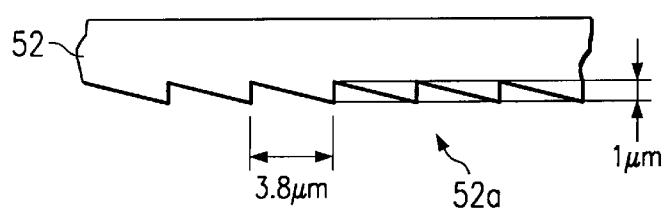
FIG. 10B is a cross-sectional view of a transmissive diffractive optical element (DOE)

In order to reduce chromatic aberration at the DOE 52a, it is preferable that the transmissive DOE (diffraction grating) 52a on the reflection angle characteristic converting optical system 52 be close to the DMD 61. Therefore, the DOE 52a is formed on a surface of the reflection angle characteristic converting optical system 52 on the side of the DMD 61 (the lower surface in the figure). In this embodiment, since first-order diffracted light is used, the cross section of the transmissive DOE 52a has a blazed configuration (serrate configuration) as shown in FIG. 10B in order to most efficiently diffract the first-order diffracted light. When the reference wavelength of the diffracted light is 0.5μm, the grating pitch of the diffraction grating is 3.8 μm and the grating height is approximately 1 μm as shown in the figure. The reflection angle converting optical system 52 is made of a material with a refractive index of 1.5.

Construction data of the projection optical system of this embodiment are shown in Table 2. In the table, the surfaces marked with asterisks are aspherical, and aspherical coefficients are also shown. The expression representing an aspherical surface is the same as that of the first embodiment.

Figure 11A:
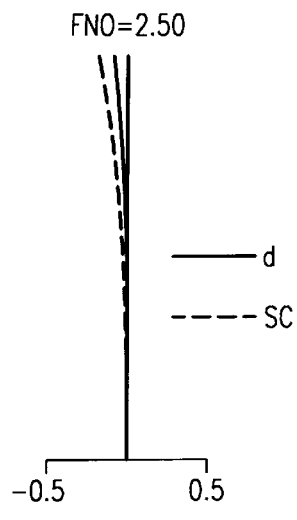
FIGS. 11A to 11C are graphic representations of aberrations of a projection optical system of the fourth embodiment.
Figure 11B:
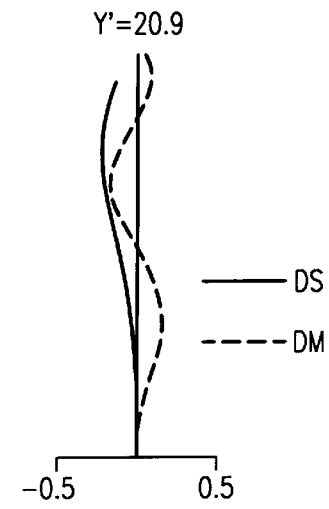
Figure 11C:
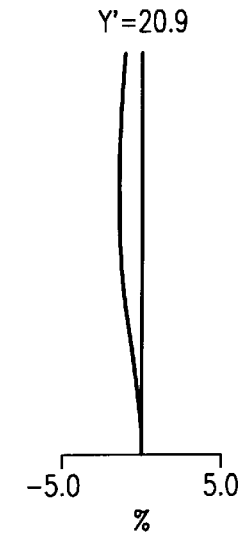

FIGS. 11A to 11C are graphic representations of aberrations of the projection optical system. In FIG. 11A showing spherical aberration, the solid line d represents spherical aberration to the d-line and the broken line SC represents sine condition. In FIG. 11B showing astigmatism, the solid line DS and the broken line DM represent astigmatisms of the sagittal luminous flux and the meridional luminous flux, respectively. In FIG. 1C, the solid line represents distortion.

<Fifth Embodiment>

Figure 12:
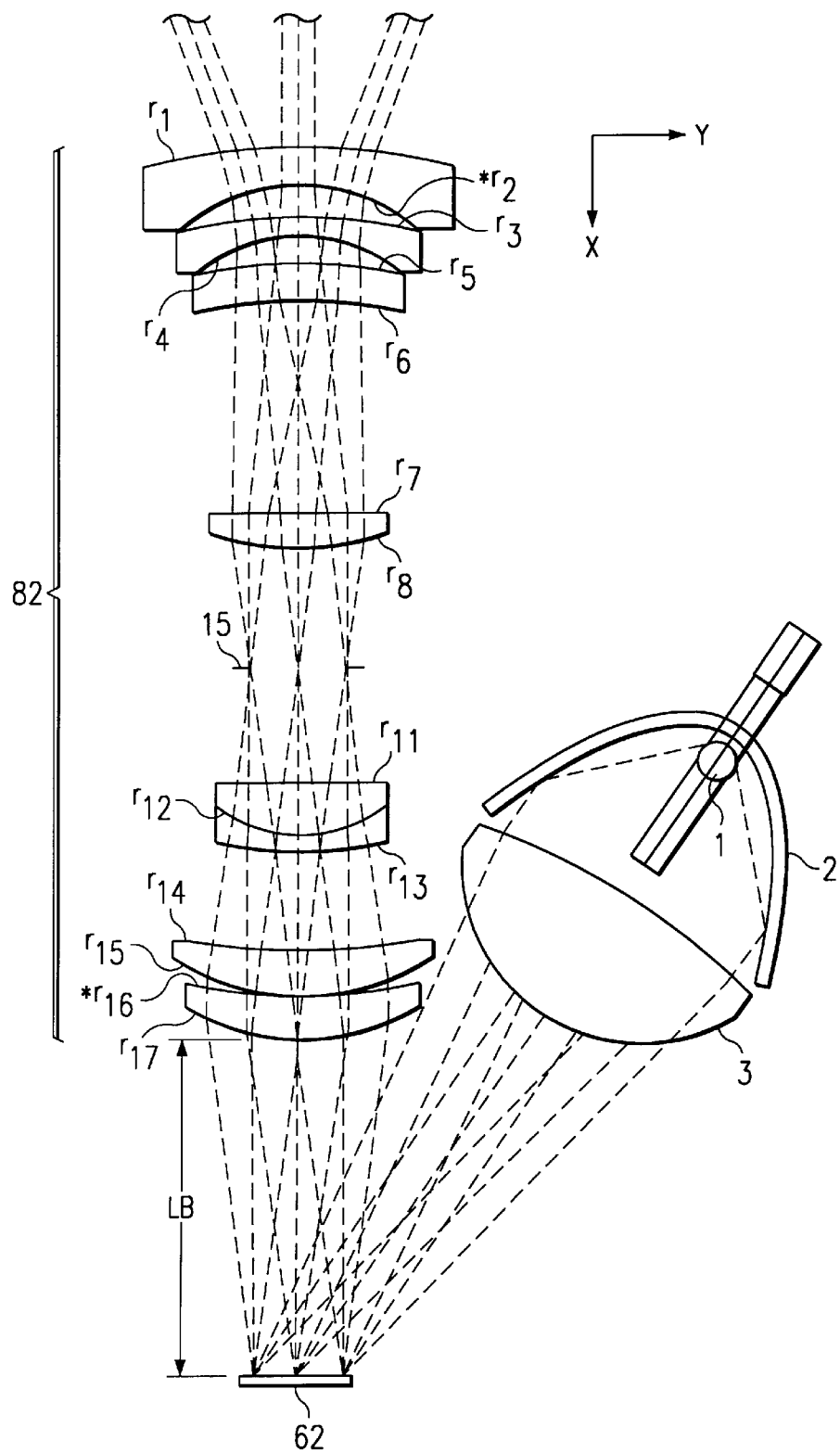
FIG. 12 is a longitudinal cross-sectional view showing the general structure of a display apparatus according to a fifth embodiment of the present invention.

FIG. 12 is a view showing the general structure of a display apparatus according to a fifth embodiment of the present invention. In the figure, reference numeral 1 represents a light source, reference numeral 2 represents a reflector of, for example, a parabolidal configuration disposed so as to surround the light source 1 and converting the light from the light source 1 into substantially parallel light, and reference numeral 3 represents an illumination optical system disposed obliquely below the reflector 2 for uniformly illuminating a subsequently—described DMD with efficiency. The element designated 62 disposed ahead obliquely to the illumination optical system 3 is the DMD having a reflective DOE formed on each micromirror.

The element designated 82 disposed above the DMD 62 is a projection optical system. The element designated 9 disposed thereabove is a screen. Reference numeral 15 represents a diaphragm provided in the projection optical system 82.

As shown in FIG. 12, illumination light comprising a mixture of direct light from the light source 1 and reflected light from the reflector 2 passes through the illumination optical system 3 and is incident on the DMD 62. The behavior of the light at the DMD 62 will be described later in detail with reference to FIG. 13. The incident light is selectively reflected at the DMD 62 pixel by pixel according to a predetermined incidence-reflection angle characteristic and only reflected light (projection light) of a specific incidence-reflection angle characteristic is incident on the projection optical system 82. The projection light passes therethrough to be imaged on the screen 9.

Figure 13:
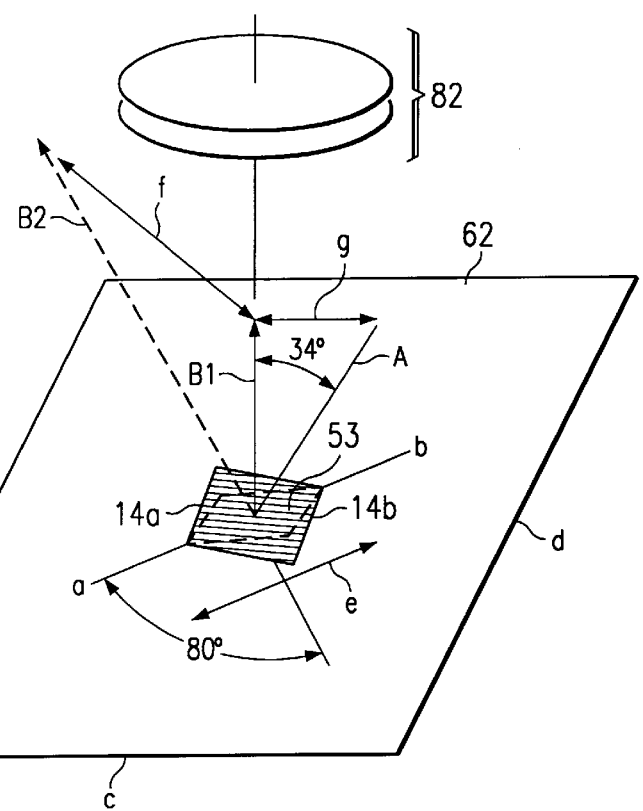
FIG. 13 is a perspective view schematically showing the optical path image in a DMD.

FIG. 13 is a perspective view schematically showing an optical path image in the DMD 62. In the figure, reference numeral 62 represents the DMD acting as the reflective display panel, reference numeral 14*a* shown by the solid line represents the micromirror at a pixel of the DMD 62 which micromirror is in the ON condition, reference numeral 14*b* shown by the broken line represents the micromirror which is in the OFF condition, and reference numeral 82 represents a projection optical system disposed above the DMD 62 and forming images by transmitting subsequently-described projection light from the DMD 62.

As shown in FIG. 13, the rotation axis ab of the micromirror 14*a* (14*b*) forms, as shown by the arrow e, an angle of 45 degrees to the short sides c or the long sides d of the rectangle constituted by the DMD 62. The micromirror 14*a* (14*b*) rotates about the rotation axis ab between two opposite angles so as to incline ±10 degrees pixel by pixel. The condition where the micromirror inclines +10 degrees is set as the ON condition and the condition in which the micromirror inclines −10 degrees is set as the OFF condition. The reflected light (projection light) is directed toward the projection optical system 82 when the micromirror is the ON condition.

A transmissive DOE 53 is provided on each micromirror 14*a* (14*b*) of the DMD 62. The direction of grooves of the DOE 53 forms, as shown in FIG. 13, an angle of 80 degrees to the rotation axis ab of the micromirror. The DOE 53 has a blazed configuration like that of the fourth embodiment. A display optical system using the DMD 62 constitutes an illumination optical apparatus comprising the light source 1, the reflector 2 and the illumination optical system 3 shown in FIG. 12 so that the illumination light A is incident at an incidence angle of 34 degrees to the surface of the DMD 62 within a surface in the direction of the short sides c as shown by the arrow g.

When reflected at the micromirror 14*a* being in the ON condition, the illumination light A becomes the projection light B1 with a reflection angle of 0 degree to the surface of the DMD 62, and is directed to the projection optical system 82 in a direction vertical to the surface of the DMD 62. When reflected at the micromirror 14*b* being in the OFF condition, the illumination light A is directed like the projection light B2 within a surface forming another angle of 45 degrees to the short sides c or the long sides d as shown by the arrow f, and is not input to the projection optical system 82. The projection optical system 82 forms images by use of only the projection light B1 which is a luminous flux with a reflection angle of 0 degree.

The grating pitch of the reflective DOE 53 is 1.24 µm and the grating height is approximately 0.25 µm. Since the angle of incidence of the illumination light A on the surface of the DMD 62 is as large as 34 degrees, the lens back focal length LB shown in FIG. 12 is slightly longer than that of the fourth embodiment. However, the display optical system can be structured without the use of a totally reflecting prism.

Figure 14A:
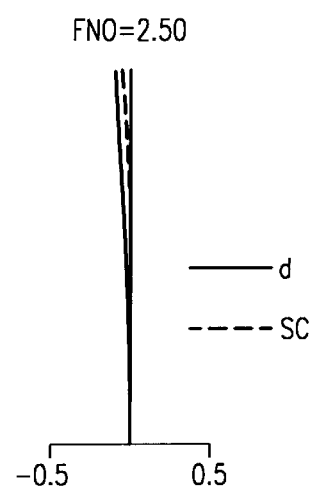
FIGS. 14A to 14C are graphic representations of aberrations of a projection optical system in the fifth embodiment.
Figure 14B:
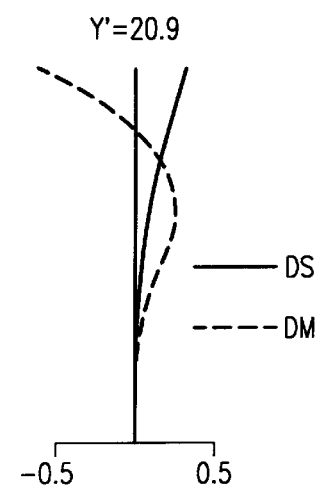
Figure 14C:
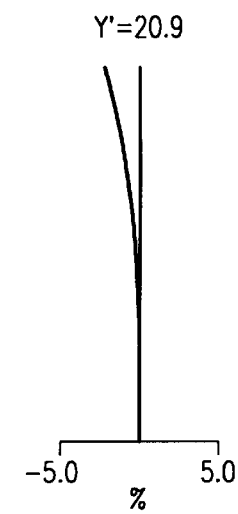

Construction data of the projection optical system of this embodiment are shown in Table 3. In the table, the surfaces marked with asterisks are aspherical, and aspherical coefficients are also shown. The expression representing an aspherical surface is the same as that of the first embodiment. FIGS. 14A to 14C are graphic representations of aberrations of the projection optical system. In FIG. 14A showing spherical aberration, the solid line d represents spherical aberration to the d-line and the broken line SC represents sine condition. In FIG. 14B showing astigmatism, the solid line DS and the broken line DM represent astigmatisms of the sagittal luminous flux and the meridional luminous flux, respectively. In FIG. 14C, the solid line represents distortion.

Figure 15A:
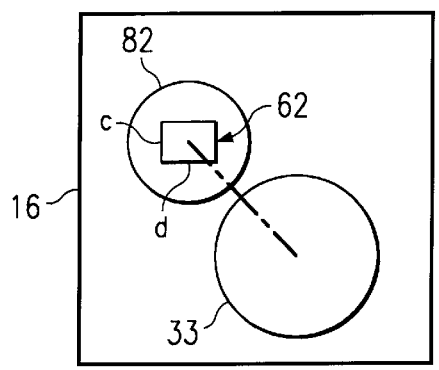
FIGS. 15A and 15B are views schematically showing the relationship between the arrangement of an optical system and the size of a projector.

Normally, the direction of the long sides of images projected onto a screen or the like is the horizontal direction of the projector and the direction of the short sides is the vertical direction. Therefore, when the illumination optical system 3 is disposed so as to form an angle of 45 degrees to the short sides c or the long sides d of the DMD 62 corresponding to the projector as shown in FIG. 15A, the illumination optical system 3 together with the projection optical system 82 requires a large space in both the horizontal and vertical directions of the apparatus 16. As a result, the apparatus 16 increases in size.

Figure 15B:
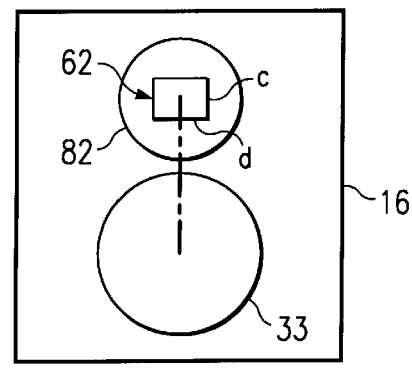

Therefore, by disposing the illumination optical system 3 in the direction of the short sides c of the DMD 62 as shown in FIG. 15B, the size of the apparatus 16 largely decreases in the horizontal direction. This contributes to size reduction of the apparatus.

<Sixth Embodiment>

Figure 16:
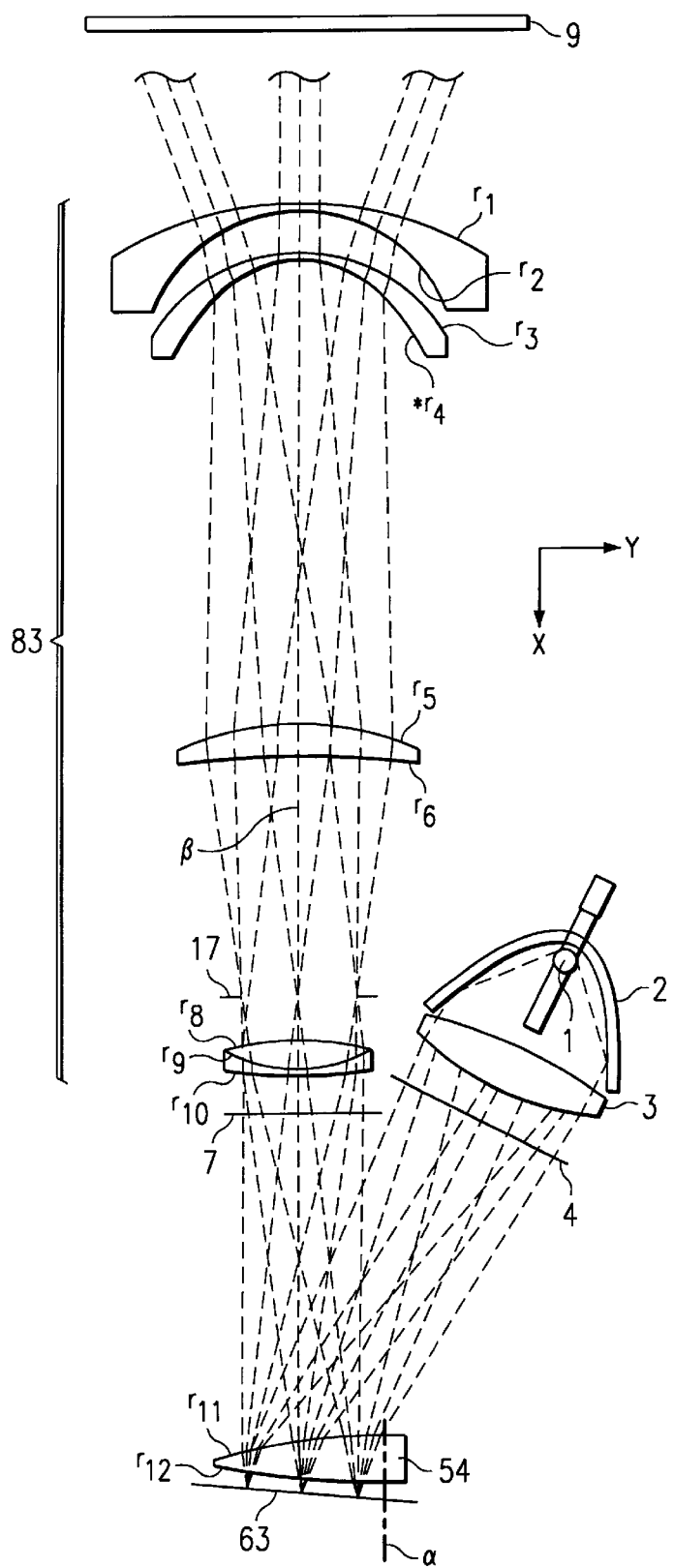
FIG. 16 is a longitudinal cross-sectional view showing the general structure of a display apparatus according to a sixth embodiment of the present invention.

FIG. 16 is a view showing the general structure of a display apparatus according to a sixth embodiment of the present invention. In the figure, reference numeral 1 represents a light source, reference numeral 2 represents a reflector of, for example, a paraboldal configuration disposed so as to surround the light source 1 and convert the light from the light source 1 into substantially parallel light, reference numeral 3 represents an illumination optical system disposed obliquely below the reflector 2 for uniformly illuminating a subsequently—described reflective LCD panel with efficiency, and reference numeral 4 represents an illumination-side polarizing plate disposed obliquely there below. The element designated 54 disposed ahead obliquely to the illumination-side polarizing plate 4 is a decentered condenser lens acting as the reflection angle converting optical system. The element designated 63 disposed there below is the reflective LCD panel acting as the reflective display panel.

The element designated 7 disposed above the condenser lens 54 is a projection-side polarizing plate. The element designated 83 disposed thereabove is a projection optical system. The element designated 9 disposed thereabove is a screen. Reference numeral 17 represents a diaphragm provided in the projection optical system 83.

As shown in FIG. 16, illumination light comprising a mixture of direct light from the light source 1 and reflected light from the reflector 2 passes through the illumination optical system 3 and further passes through the illumination-side polarizing plate 4, where the luminous flux thereof is limited to a predetermined polarization plane. Then, the illumination light is incident on the condenser lens 54. The behavior of the light at the condenser lens 54 will be described later in detail with reference to FIG. 17. The illumination light having passed through the condenser lens 54 has its polarization plane selectively rotated 90 degrees pixel by pixel by the reflective LCD panel 63, or is reflected without its polarization plane being rotated. Then, the illumination light again passes through the condenser lens 54 and is incident on the projection-side polarizing plate 7. Of the reflected light (projection light) from the reflective LCD panel 63, only the light whose polarization plane has been rotated 90 degrees passes through the projection-side polarizing plate 7. The projection light having passed through the projection-side polarizing plate 7 is imaged on the screen 9 by the projection optical system 83 which is a non-telecentric optical system.

While the illumination optical system 3 is shown as one convex lens element in FIG. 16, the use of an integrator using a lens array or a polarization converting optical system results in more efficient and uniform illumination. In the polarization converting optical system, luminous fluxes other than the luminous fluxes of a predetermined polarization plane necessary for liquid crystal are not discarded but are converted into a predetermined polarization plane and used for illumination.

In this embodiment, as the reflection angle converting optical system, the decentered condenser lens 54 is disposed immediately ahead of the reflective LCD panel 63 as mentioned above. The optical axis of the decentered condenser lens 54 is represented by the dash and dotted line α. In this case, with respect to the decentering amount of the condenser lens 54, when the image height of the reflective display panel 63 in the direction of decentering of the condenser lens 54 is H, it is preferable that the optical axis α of the condenser lens 54 be decentered by 0.5 H to 2.0 H from the optical axis β of the projection optical system 83. The reflective LCD panel 63 is disposed so that the center thereof substantially coincides with the optical axis β of the projection lens optical system 83.

When the decentering amount is 0.5 H or smaller, since the decentering amount is small, it is impossible to perform excellent illumination in the entire range in a wide-angle optical system, so that a substantially telecentric optical system is necessary. Particularly, in a projector of a rear projection type, an extremely wide-angle projection optical system is necessary. Therefore, it is preferable that the decentering amount be 0.8 H or larger. When the decentering amount is 2.0 H or larger, since the decentering amount is large, the curvature is so high that the astigmatic difference becomes excessive at the endmost position of the condenser lens 54, so that excellent image quality cannot be obtained. In order that the projection optical system 83 is non-telecentric and to obtain a compact structure, it is preferable that the focal length of the condenser lens 54 be 20 H to 6 H.

In this embodiment, the illumination optical system 3 forms not parallel light but a divergent luminous flux. The projection optical system 83 which is a non-telecentric optical system as mentioned above is comparatively small in diameter and includes a small number of lens elements. In order to correct the inclination of the image plane due to the decentered condenser lens 54, the reflective LCD panel 63 slightly inclines to the vertical with respect to the direction of the optical axis $\mu$ of the projection optical system 83. Since the image plane inclination cannot be sufficiently corrected when the inclination of the panel 63 is too small and large distortion is caused when the inclination is too large, it is desirable that 2 degrees <|inclination angle|<8 degrees.

Figure 17:
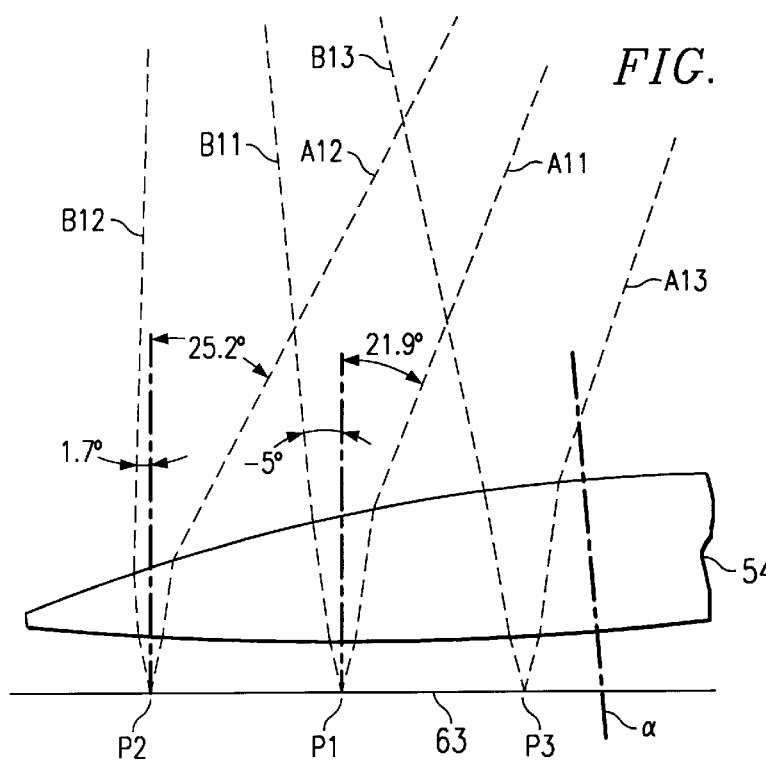
FIG. 17 is an optical path image view of a condenser lens and a reflective LCD panel.

FIG. 17 is an optical path image view of the condenser lens 54 and the reflective LCD panel 63. The illumination light from the upper right of the figure passes through the decentered condenser lens 54, and is incident on, for example, a central portion P1, a left portion P2 and a right portion P3 of the LCD panel 63 to be reflected. Then, the light again passes through the condenser lens 54 in the opposite direction and is directed in the upward direction of the figure to the projection optical system 83. As shown in the figure, in the central portion P1 of the reflective LCD panel 6, illumination light A11 and projection light B11 is incident on and exits from the decentered condenser lens 54 at an incidence angle of 21.9 degrees and a reflection angle of −5.0 degrees to the surface, respectively. At this time, the "incidence angle+reflection angle" is 16.9 degrees.

In the left portion P2 of the reflective LCD panel 6 of the figure, illumination light A12 and projection light B12 is incident on and exits from the decentered condenser lens 54 at an incidence angle of 25.2 degrees and a reflection angle of 1.7 degrees to the surface, respectively. At this time, the "incidence angle+reflection angle" is 26.9 degrees. By changing the incidence-reflection angle characteristic according to the display area of the reflective display panel 63 like in this embodiment, the projection optical system 83 can be made non-telecentric, so that the cost can be reduced by reducing the size of the lens system and reducing the number of lens elements.

Construction data of the projection optical system of this embodiment are shown in Table 4. In the table, the surfaces marked with asterisks are aspherical, and aspherical coefficients and the decentering amount and the position of the decentered lens are also shown. The expression representing an aspherical surface is the same as that of the first embodiment.

The lens having the eleventh surface (r11) and the twelfth surface (r12) is the decentered condenser lens 54. In this embodiment, the decentering direction of the condenser lens 54 is the direction of the short sides of the reflective LCD panel 63 and H=11. When the projection optical system and the reflection angle converting optical system can be regarded as an optical system including a decentered lens element like in this embodiment, more excellent performance can be obtained by slightly decentering a lens element of the projection optical system, that is, the lens element having the eighth surface (r8) and the ninth surface (r9) in this embodiment.

Figure 18A:
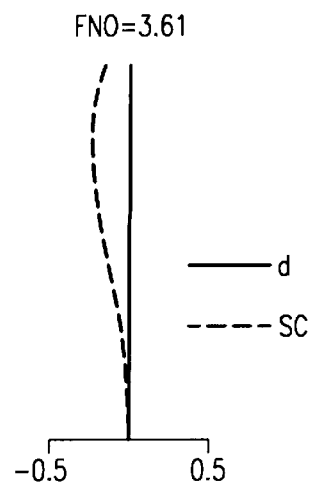
FIGS. 18A to 18C are graphic representations of aberrations of a projection optical system of the sixth embodiment.
Figure 18B:
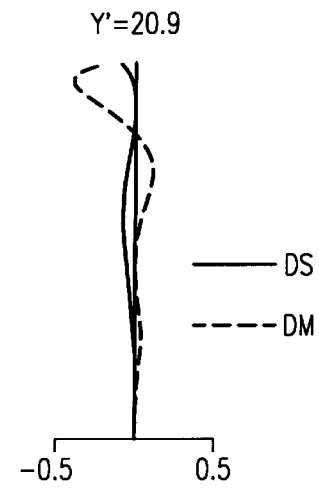
Figure 18C:
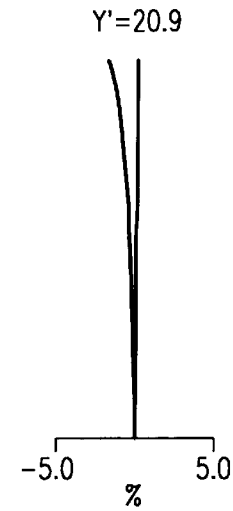

FIGS. 18A to 18C are graphic representations of aberrations of the projection optical system. In FIG. 18A showing spherical aberration, the solid line d represents spherical aberration to the d-line and the broken line SC represents sine condition. In FIG. 18B showing astigmatism, the solid line DS and the broken line DM represent astigmatisms of the sagittal luminous flux and the meridional luminous flux, respectively. In FIG. 18C, the solid line represents distortion.

<Seventh Embodiment>

Figure 19:
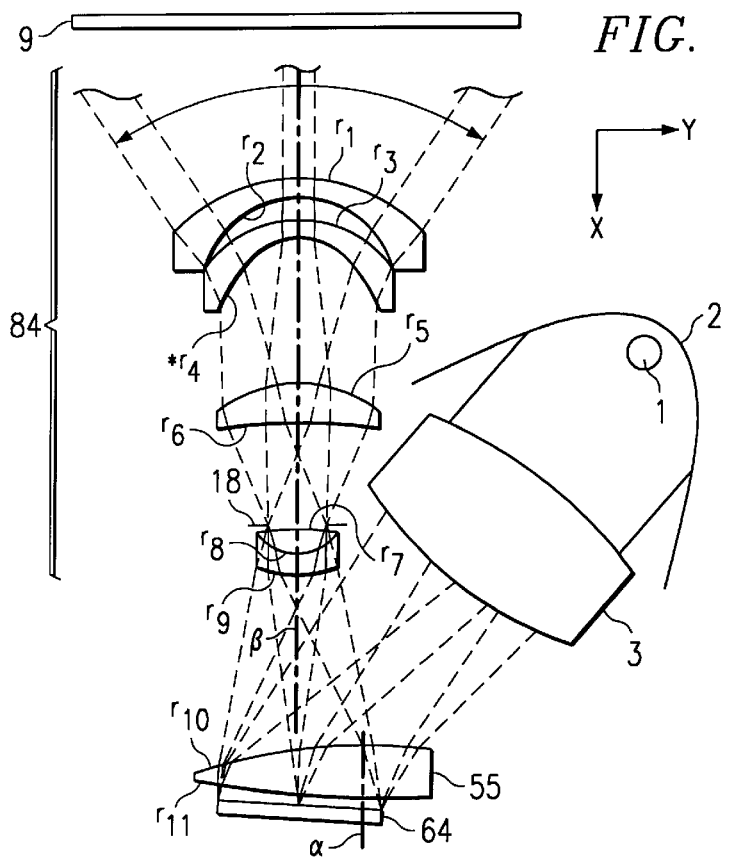
FIG. 19 is a longitudinal cross-sectional view showing the general structure of a display apparatus according to a seventh embodiment of the present invention.

FIG. 19 is a view showing the general structure of a seventh embodiment of the present invention. In the figure, reference numeral 1 represents a light source, reference numeral 2 represents a reflector of, for example, a paraboloidal configuration disposed so as to surround the light source 1 and converting the light from the light source 1 into substantially parallel light, and reference numeral 3 represents an illumination optical system disposed obliquely below the reflector 2 for uniformly illuminating a subsequently-described DMD with efficiency. The element designated 55 disposed ahead obliquely to the illumination optical system 3 is a decentered condenser lens acting as the reflection angle optical system. The element designated 64 disposed there below is the DMD acting as the reflective display panel. The element designated 84 disposed above the condenser lens 55 is a projection optical system. The element designated 9 disposed thereabove is a screen. Reference numeral 18 represents a diaphragm provided in the projection optical system 84.

As shown in FIG. 19, illumination light comprising a mixture of direct light from the light source 1 and reflected light from the reflector 2 passes through the illumination optical system 3 and is incident on the condenser lens 55. The behavior of the light at the condenser lens 55 will be described later in detail with reference to FIG. 20. The illumination light having passed through the condenser lens 55 is selectively reflected at the DMD 64 pixel by pixel according to a predetermined incidence-reflection angle characteristic and again passes through the condenser lens 55. Then, only reflected light (projection light) of a specific incidence-reflection angle characteristic passes through the projection optical system 84 which is a non-telecentric optical system and is imaged on the screen 9.

In this embodiment, as the reflection angle converting optical system, the decentered condenser lens 55 is disposed immediately ahead of the DMD 64 as mentioned above. The optical axis of the decentered condenser lens 55 is represented by the dash and dotted line α. In this case, with respect to the decentering amount of the condenser lens 55, when the image height of the DMD 64 in the direction of decentering of the condenser lens 54 is H, it is preferable that the optical axis α of the condenser lens 55 be decentered by 0.5 H to 2.0 H from the optical axis β of the projection optical system 84.

When the decentering amount is 0.5 H or smaller, since the decentering amount is small, it is impossible to perform excellent illumination in the entire range in a wide-angle optical system, so that a substantially telecentric optical system is necessary. When the decentering amount is 2.0 H or larger, since the decentering amount is large, the curvature is so high that the astigmatic difference becomes excessive at the endmost position of the condenser lens 55, so that excellent image quality cannot be obtained. In order that the projection optical system 84 is non-telecentric and to obtain a compact structure, it is preferable that the focal length of the condenser lens 55 be 20 H to 6 H.

Figure 20:
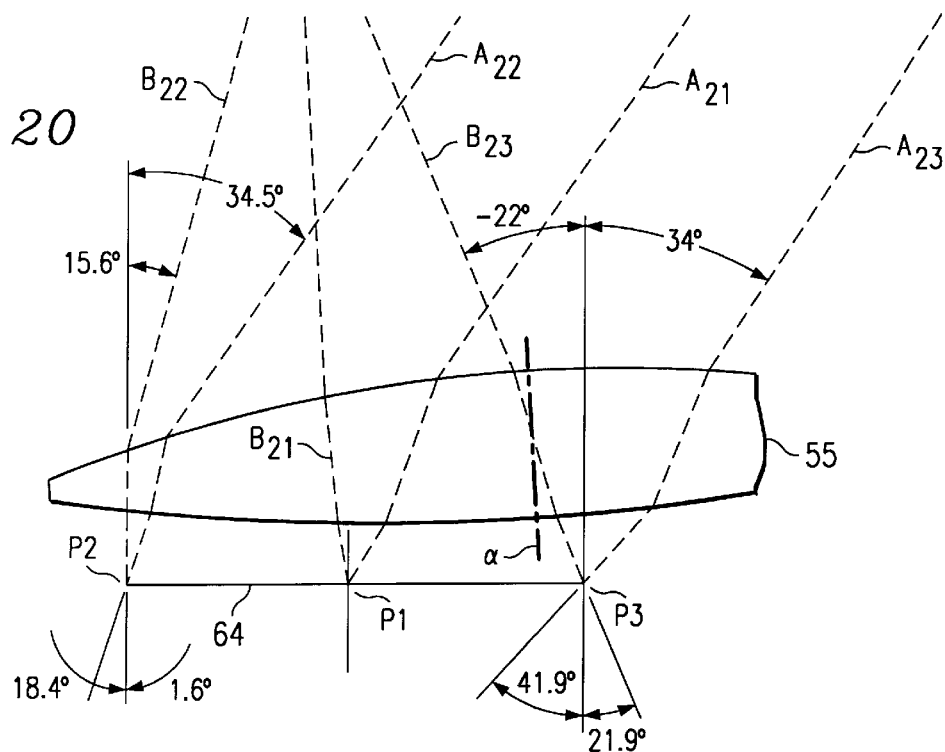
FIG. 20 is an optical path image view of a condenser lens and a DMD.

FIG. 20 is an optical path image view of the condenser lens 55 and the DMD 64. The illumination light from the upper right of the figure passes through the decentered condenser lens 55, and is incident on, for example, a central portion P1, a left portion P2 and a right portion P3 of the DMD 64 to be reflected. Then, the light again passes through the condenser lens 55 in the opposite direction and is directed in the upward direction of the figure to the projection optical system 84. As shown in the figure, in the right portion P3 of the DMD 64, illumination light A23 and projection light B23 is incident on and exits from the decentered condenser lens 55 at an incidence angle of 34 degrees and a reflection angle of −22 degrees to the surface, respectively. At this time, the "incidence angle+reflection angle" is 12 degrees.

In this arrangement, since light passes in the vicinity of the optical axis α of the condenser lens 55, it never occurs that the light is largely bent by the condenser lens 55. For pixels in the display the ON condition, the DMD acting as the reflective display panel vertically reflects the illumination light with an incidence angle of 20 degrees to the surface. That is, the reflection angle =20 degrees—the incidence angle. The direct incidence angle to the surface of the DMD 64 is 41.9 degrees, and the reflection angle is −21.9 degrees.

In the left portion P1 of the DMD 64, illumination light A22 and projection light B22 is incident on and exits from the decentered condenser lens 55 at an incidence angle of 34.5 degrees and a reflection angle of 15.6 degrees to the surface, respectively. At this time, the "incidence angle+reflection angle" is 50.1 degrees. In this portion, since the light passes through the end of the condenser lens 55, the light is largely bent by the condenser lens 55. Consequently, the incidence-reflection angle characteristic largely differs from the one intrinsic to the DMD. The direct incidence angle to the surface of the DMD 64 is 18.4 degrees, and the reflection angle is 1.6 degrees. In the central portion P1, illumination light A21 and projection light B21 is incident and exits.

By thus using the decentered condenser lens 55, it does not occur that only a narrow projection view angle can be obtained so that only a part of the image area of the projection optical system 84 can be used, but the entire image area of the projection optical system can be used, so that a small-size and wide-angle projection optical system can be structured.

Construction data of the projection optical system of this embodiment are shown in Table 5. In this embodiment, the image height in the decentering direction is H=18.4. In the table, the surfaces marked with asterisks are aspherical, and aspherical coefficients and the decentering amount and the position of the decentered lens are also shown. The expression representing an aspherical surface is the same as that of the first embodiment.

Figure 21A:
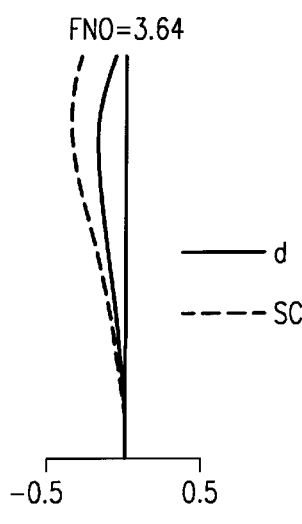
FIGS. 21A to 21C are graphic representations of aberrations of a projection optical system of the seventh embodiment.
Figure 21B:
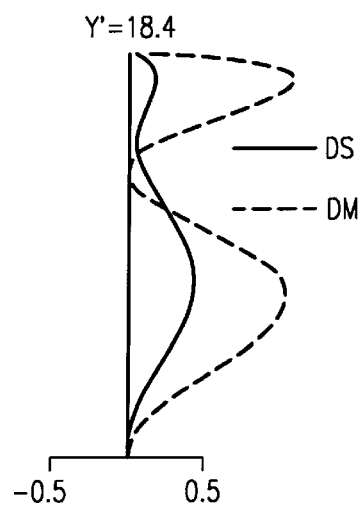
Figure 21C:
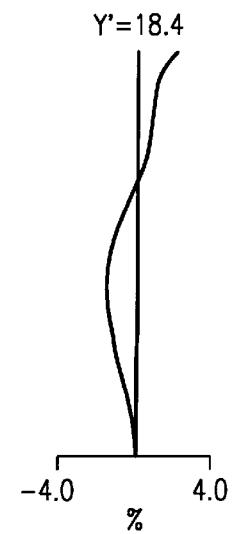

The lens having the tenth surface (r10) and the eleventh surface (r11) is the decentered condenser lens 55. FIGS. 21A to 21C are graphic representations of aberrations of the projection optical system. In FIG. 21A showing spherical aberration, the solid line d represents spherical aberration to the d-line and the broken line SC represents sine condition. In FIG. 21B showing astigmatism, the solid line DS and the broken line DM represent astigmatisms of the sagittal luminous flux and the meridional luminous flux, respectively. In FIG. 21C, the solid line represents distortion.

<Eighth Embodiment>

Figure 22:
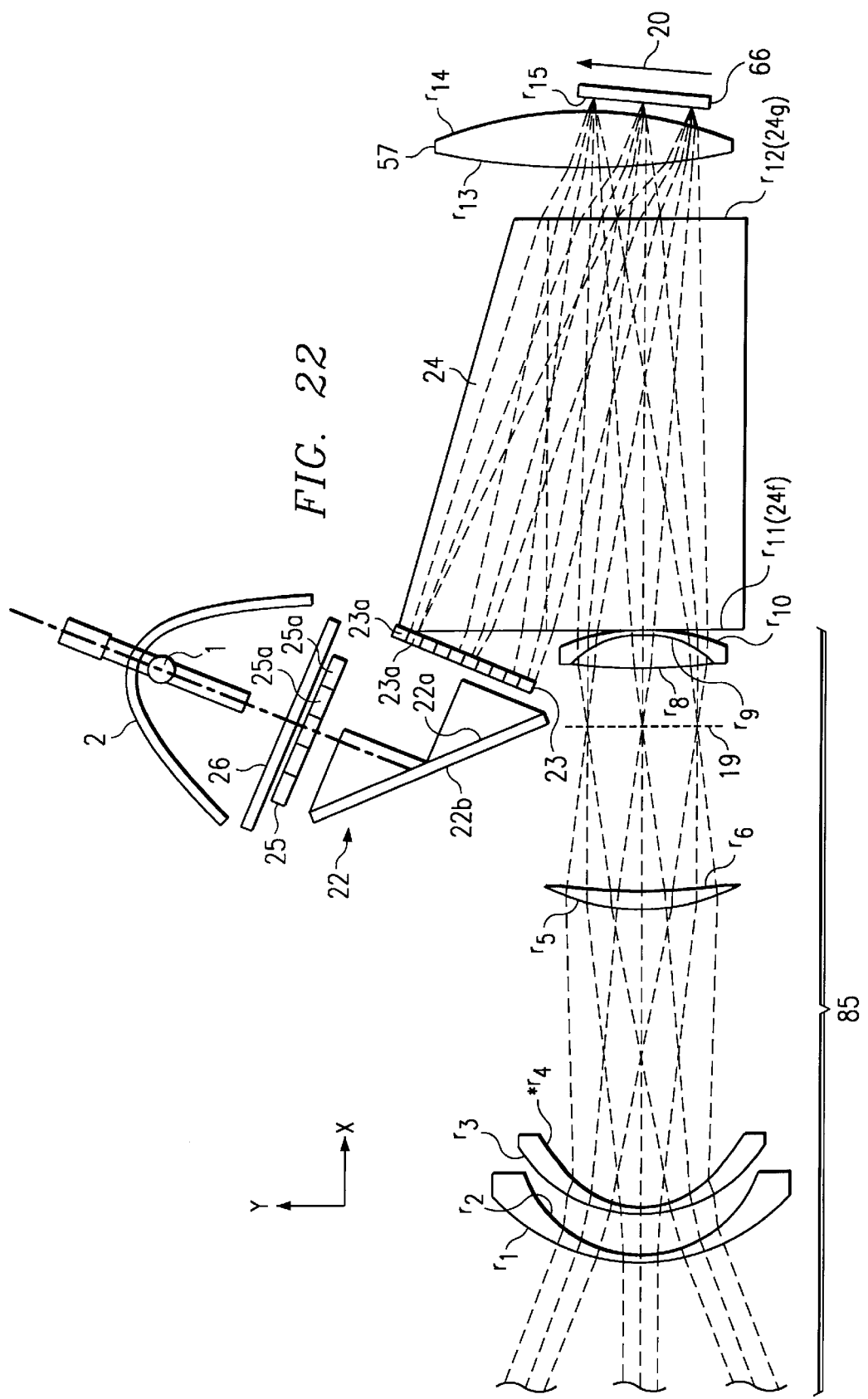
FIG. 22 is a vertical cross-sectional view showing the general structure of a color display apparatus according to an eighth embodiment of the present invention.
Figure 23:
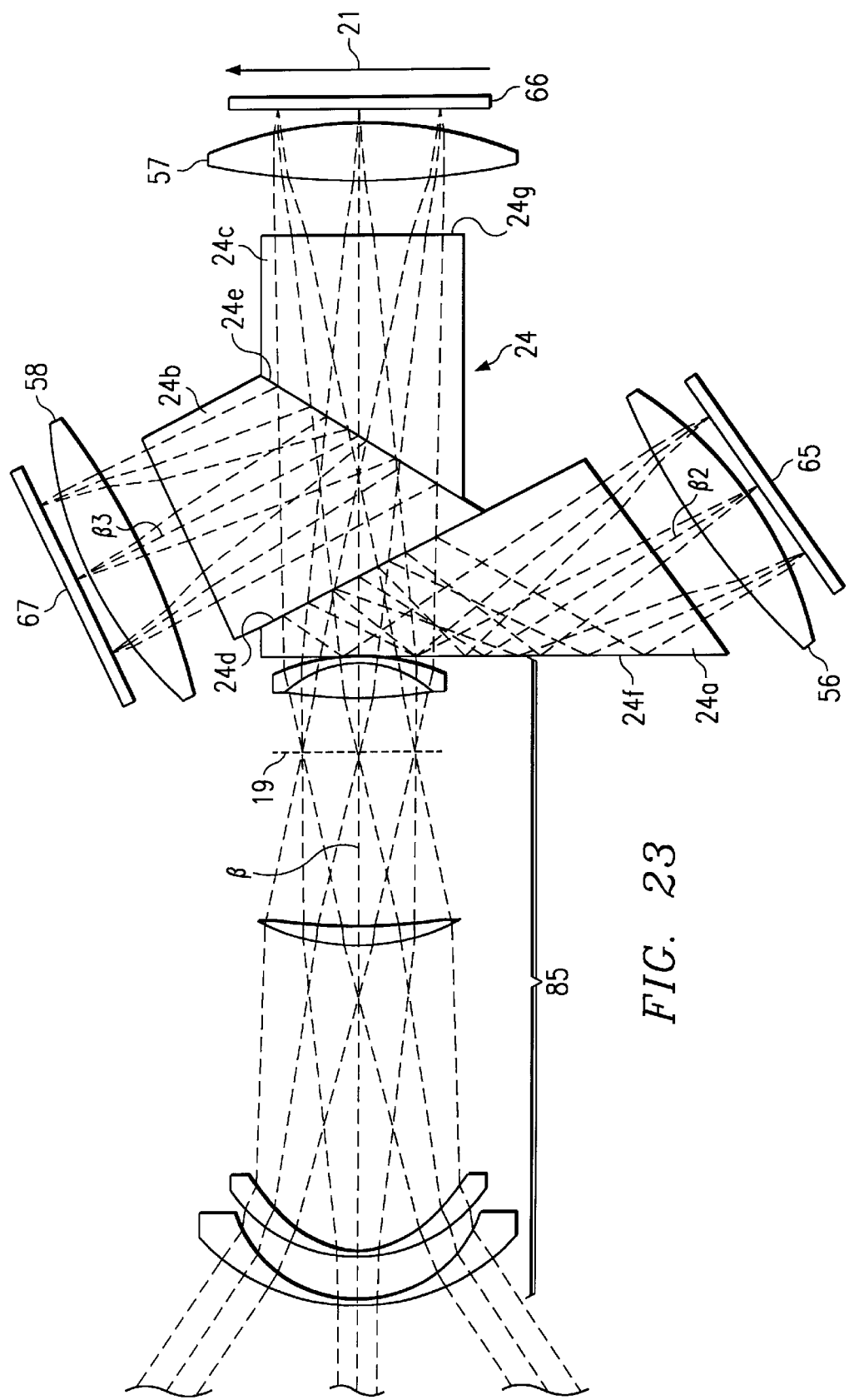
FIG. 23 is a horizontal cross-sectional view showing the general structure of the color display apparatus according to the eighth embodiment of the present invention.

FIGS. 22 and 23 are views showing the general structure of a color display apparatus according to an eighth embodiment of the present invention. FIG. 22 is a vertical cross-sectional view including the optical axis of a projection optical system. FIG. 23 is a horizontal cross-sectional view. Reference numeral 1 represents a light source. Reference numeral 2 represents a reflector of, for example, a paraboloidal configuration disposed so as to surround the light source 1 and convert the light from the light source 1 into substantially parallel light. Reference numeral 26 represents an IR-UV cut filter that cuts unnecessary wavelength regions of the light incident from the light source 1 and the reflector 2.

Reference numeral 25 represents a first lens array comprising a plurality of lens cells 25a arranged in a matrix. The first lens array 25 is disposed in a position being conjugate with the reflective LCD panel because of the optical actions of a second lens array and a condenser lens described later. Reference numeral 22 represents a polarizing and separating prism having a dichroic mirror surface 22a reflecting only an s-polarized luminous flux and a totally reflecting mirror surface 22b.

Reference numeral 23 represents the second lens array comprising a plurality of lens cells 23a arranged in a matrix. The second lens array 23 is disposed in a position being conjugate with the light source 1 because of the optical actions of the first lens array 25 and the reflector 2. The lateral density of the lens cells 23a of the second lens array 23 is twice the lateral density of the first lens array 25.

Although not shown, a half wave plate that converts a p-polarized luminous flux into an s-polarized luminous flux is provided on the incidence plane of the lens cell 23a of the second lens array 23 corresponding to a p-polarized luminous flux. Consequently, the light exiting from the second lens array 23 is all s-polarized.

Reference numeral 24 represents a color separating and synthesizing prism comprising three hexahedral prisms 24a, 24b and 24c. The three prisms 24a, 24b and 24c are cemented so that the prisms 24a and 24b form a joint surface 24d and the prisms 24b and 24c form a joint surface 24e. Details such as the angles of the surfaces will be described later in detail.

On the joint surface 24d, a dichroic multilayer film that reflects, of visible light, light of a wavelength (B) of substantially 510 nm or lower and transmits luminous fluxes of other wavelengths is deposited (dichroic coating). On the joint surface 24e, a dichroic multilayer film that reflects, of visible light, light of a wavelength (R) of substantially 580 nm or upper and transmits luminous fluxes of other wavelengths is deposited.

Reference numerals 56, 57 and 58 represent decentered condenser lenses. Reference numerals 65, 66 and 67 represent rectangular reflective LCD panels that convert electric images of R, G and B into optical images, respectively. Describing with the reflective LCD panel 66 as an example, the arrow 20 represents the direction of the short sides, and the arrow 21 represents the direction of the long sides. The arrangement in which the plane including the optical axis of the illumination optical system and the optical axis of the projection optical system is parallel to the direction 20 of the short sides of the reflective LCD panels 65, 66 and 67 like in this embodiment is preferable because the angle of separation between the illumination light and the projection light can be reduced. On the contrary, an arrangement in which the plane is parallel to the direction of the long sides 21 is not preferable because it is necessary to increase the optical powers of the condenser lenses 56, 57 and 58 in order to increase the angle of separation and this makes the aberration correction of the projection optical system difficult.

The reflective LCD panels 65, 66 and 67 selectively rotate the polarization plane of the incident light pixel by pixel or reflect the incident light without rotating the polarization plane. A non-illustrated polarizing plate transmits only a rotated p-polarized component to form projection light. Reference numeral 85 represents a projection optical system which is a non-telecentric optical system that images the projection light from the prism 24 on a non-illustrated screen. Reference numeral 19 represents a diaphragm provided in the projection optical system 85.

In the above-described arrangement, a randomly polarized luminous flux emanating from the light source 1, part of which luminous flux is directly incident on the IR-UV cut filer 26 and the remaining of which luminous flux is incident on the filter 26 after reflected at the reflector 2, has its unnecessary components cut by the IR-UV cut filter 26, and is then incident on the first lens array 25. At the first lens array 25, the luminous flux is separated into a plurality of luminous fluxes and made incident on the polarizing and separating prism 22, where the s-polarized light is reflected at the dichroic surface 22a and the p-polarized light is reflected at the totally reflecting surface 22b, thereby separating the luminous fluxes into s-polarized light and p-polarized light. The s-polarized light is directly incident on the second lens array 23, whereas the p-polarized light is s-polarized by the non-illustrated half wave plate at the incidence plane and is then incident on the second lens array 23 to form a light source image.

With the light source image as a secondary light source, a plurality of luminous fluxes exit from the second lens array 23, and are obliquely incident on a surface 24f of the color separating and synthesizing prism 24 from above. Of the luminous fluxes incident on the prism 24, the luminous flux of B is reflected at the joint surface 24d, the luminous flux of R is reflected at the joint surface 24e, and the remaining luminous flux of G is supplied to the reflective LCD panel 66 through the condenser lens 57. The luminous flux of B reflected at the joint surface 24d is totally reflected at the surface 24f since the angle of incidence on the surface 24f is large, and is then supplied to the reflective LCD panel 65 through the condenser lens 56. The luminous flux of R reflected at the joint surface 24e is supplied to the reflective LCD panel 67 through the condenser lens 58.

The projection light rays forming the optical images of R, G and B generated by the reflective LCD panels 65, 66 and 67 are incident on the color separating and synthesizing prism 24 through the condenser lenses 56, 57 and 58. The projection light of B is reflected at the surface 24f and at the joint surface 24d and then passes through the surface 24f with its incidence angle to the surface 24f being substantially 0 degree. The projection light of G directly passes through the surface 24f. The projection light of R passes through the surface 24f after reflected at the joint surface 24e. Consequently, the projection light rays of the three colors are synthesized and exit from the color separating and synthesizing prism 24. The synthesized projection light is imaged on the non-illustrated screen by the projection optical system 85.

While in this embodiment, the half wave plate is provided on the incidence plane of the lens cell 23a of the second lens array corresponding to the p-polarized light so that only the s-polarized luminous flux is used as the illumination light as described above, the half wave plate may be provided on the incidence plane of the lens cell 23a corresponding to the s-polarized light so that only the p-polarized luminous flux is used as the illumination light.

In order to uniformly illuminate the reflective LCD panels 65, 66 and 67 without any eclipse, it is necessary that the light source image of the first lens array 25 formed on the second lens array 23 be in conjugate relationship with the diaphragm 19 provided in the projection optical system 85. In the above-described arrangement, since the second lens array 23 is situated substantially above the diaphragm 19, the conjugate relationship is held.

In order that the second lens array 23 is situated substantially above the diaphragm 19, the exit pupil distance of the projection optical system 85 and the focal lengths of the condenser lenses 56, 57 and 58 are substantially the same. On the contrary, in order that the second lens array 23 is situated away from the diaphragm 19, the focal lengths of the condenser lenses 56, 57 and 58 are increased, so that the distances between the reflective LCD panels 65, 66 and 67 and the second lens array 23 can be increased. While the second lens array 23 may be disposed in a position being conjugate with the diaphragm 19 provided in the projection optical system 85, the optical system may be disposed so that an image being conjugate with the second lens array 23 is formed in the position being conjugate with the diaphragm 19.

As described above, in this embodiment, the color separating and synthesizing prism having the two dichroic-coated surfaces 24d and 24e is used as the color separating and synthesizing means. Generally, the wavelength range selectively transmitted by a dichroic-coated surface changes according to the incidence angle. With respect to the degree of the change, the larger the design incidence angle is, the higher the degree of the change in characteristic wavelength range according to the angle is. Therefore, in a non-telecentric optical system having large axial and off-axial principal ray angles like in this embodiment, the angle of the axial principal ray incident on the dichroic-coated surface is set at 35 degrees or smaller (referred to as condition 1). When the angle of the axial principal ray incident on the dichroic-coated surface exceeds 35 degrees, the incidence angle increases, so that color nonuniformness on the display screen increases. When the angle is 31 degrees or smaller (referred to as condition 1b), display with less color non-uniformness is obtained.

Moreover, in this embodiment, since the optical system is non-telecentric, even when the angle of incidence on the dichroic-coated surfaces 24d and 24e is 35 degrees or smaller, there is a slight characteristic difference between the axial light and the off-axial light. As a method to solve this problem, a gradual coating is known in which the characteristic of the dichroic-coated surface slightly varies from place to place, for example, from the top to the bottom of the dichroic-coated surface 24e of FIG. 23. When the gradual coating is used, it is preferable that the dichroic-coated surface to which the gradual coating is applied be situated close to the reflective LCD panel. For the dichroic-coated surface 24e closer to the reflective LCD panel, since the positions through which the axial light and the off-axial light pass are different on the surface 24e, the gradual coating is used that cancels the coating characteristic difference due to the difference in incidence angle between the axial light and the off-axial light. Moreover, the light of R and the light of G are generally sensitive to color nonuniformness due to the characteristic difference. Therefore, the separation between the light of R and the light of G is performed on the surface 24e.

As described above, in this embodiment, the decentered condenser lenses 56, 57 and 58 are disposed immediately ahead of the reflective LCD panels 65, 66 and 67 as the reflection angle converting optical systems. It is not preferable that the condenser lenses 56, 57 and 58 be disposed largely away from the reflective LCD panels 65, 66 and 67 because a long lens back focal length is required and this makes it difficult to maintain the performance of the projection optical system 85.

When the image height of the reflective LCD panel 66 (the length of the sides of the reflective LCD panel) in the decentering direction of the condenser lens 57 is H, the optical axis $\alpha$ of the condenser lens 57 is parallelly decentered from the optical axis $\beta$ of the projection optical system 85 by 0.3 H to 2.0 H (referred to as condition 2).

The decentering amounts of the condenser lenses 56 and 58 are treated similarly to the decentering amount of the condenser lens 57 by use of the optical paths $\beta 2$ and $\beta 3$ of the projection light before synthesis whose optical path after synthesis is the optical axis $\beta$ of the projection optical system instead of the optical axis $\beta$. With respect to the projection light of G, the optical path of the projection light before synthesis whose optical path is the optical axis $\beta$ is situated on the optical axis $\beta$. $\alpha$, $\beta 2$ and $\beta 3$ are shown in FIG. 23.

When the decentering amount is 0.3 H or smaller, since the decentering amount is small, it is necessary to increase the optical power of the condenser lens in order to separate the illumination light and the projection light, so that the performance of the projection optical system is deteriorated. When the decentering amount is 2.0 H or larger, since the decentering amount is large, the diameter of the condenser lens increases, so that the cost increases. It is preferable that the decentering amount be 0.4 H to 1.0 H (referred to as condition 2b). The reflective LCD panels 65, 66 and 67 are disposed so that the centers thereof substantially coincide with the optical axes $\beta$, $\beta 2$ and $\beta 3$.

Figure 24:
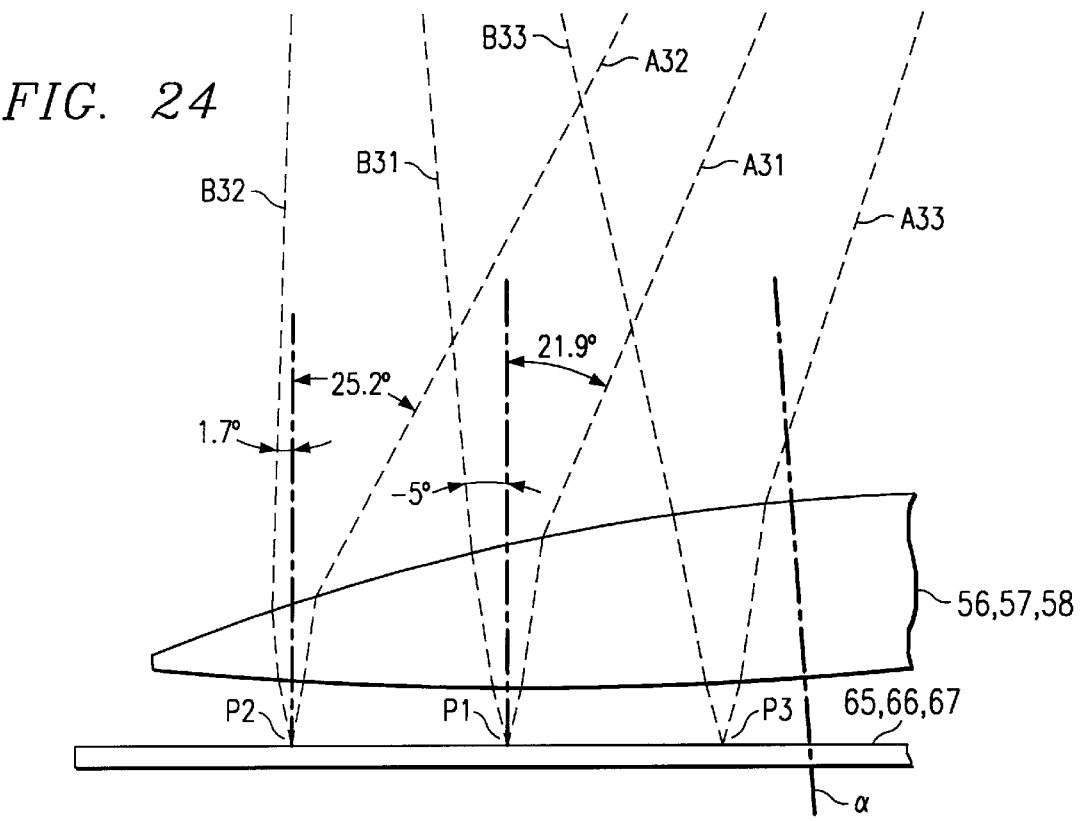
FIG. 24 is an optical path image view of condenser lenses and reflective LCD panels.

FIG. 24 is an optical path image view of the condenser lenses 56, 57 and 58 and the reflective LCD panels 65, 66 and 67. The optical paths of the condenser lenses 56, 57 and 58 are shown by the dash and dotted line $\alpha$. In FIG. 24, the illumination light from the upper right passes through the condenser lenses 56, 57 and 58, and is incident on a central portion P1, a left portion P2 and a right portion P3 of the reflective LCD panels 65, 66 and 67 to be reflected. Then, the light again passes through the condenser lenses 56, 57 and 58 in the opposite direction and is directed in the upward direction of the figure.

As shown in the figure, in the central portion P1 of the reflective LCD panels 65, 66 and 67, illumination light A31 and projection light B31 is incident on and exits from the condenser lenses 56, 57 and 58 at an incidence angle of 21.9 degrees and a reflection angle of −0.5 degrees to the surface, respectively.

In the left portion P2 of the reflective LCD panels 65, 66 and 67 of the figure, illumination light A32 and projection light B32 is incident on and exits from the condenser lenses 56, 57 and 58 at an incidence angle of 25.2 degrees and a reflection angle of 1.7 degrees to the surface, respectively. Thus, in the condenser lenses 56, 57 and 58, the angle of incidence of the illumination light on the reflective LCD panels 65, 66 and 67 and the angle of reflection of the projection light at the reflective LCD panels 65, 66 and 67 differ among the areas of the corresponding reflective LCD panels 65, 66 and 67.

Therefore, the projection optical system 85 can be made nontelecentric although the angles at which the light rays are incident on and reflected at the reflective LCD panels 65, 66 and 67 are substantially fixed, so that the cost and the size can be reduced by reducing the diameter of the projection optical system 85 and the number of lens elements. Moreover, the incidence and reflection characteristics of the LCD devices with respect to fixed angles can be optimized. This embodiment is desirable because the incidence and the reflection angles with respect to the LCD devices are substantially the same in the entire areas of the reflective LCD panels 65, 66 and 67.

As described above, the projection optical system 85 can be made non-telecentric in this embodiment. However, when the exit pupil distance of the projection optical system is too short, it is difficult to secure a lens back focal length for inserting the color separating and synthesizing prism 24. Therefore, the following conditions are fulfilled for maintaining the exit pupil distance of the projection optical system 85 appropriate.

When the focal length is f, the image height of the most off-axial ray on the reflective LCD panels 65, 66 and 67 (a value which is half the diagonal lines of the reflective LCD panels) is y and the angle between the principal ray of the most off-axial ray and the axial principal ray of the projection light incident on the projection optical system 85 is $\theta$, $y/\tan\theta/f$ is 2 to 10 (referred to as condition 3). When $y/\tan\alpha/f$ exceeds the lower limit, it is difficult to secure a sufficient lens back focal length. When it exceeds the upper limit, the number of lens elements of the projection optical system increases, so that the cost increases.

In order to correct the inclination of the image plane due to the decentered condenser lenses 56, 57 and 58, the reflective LCD panels 65, 66 and 67 slightly incline to the vertical with respect to the optical path $\beta$ of the projection optical system or the optical paths $\beta 2$ and $\beta 3$. Since the image plane inclination cannot be sufficiently corrected when the inclination is too small and large distortion is caused when the inclination is too large, it is desirable that 2 degrees <|inclination angle|<8 degrees (referred to as condition 4).

Construction data of this embodiment are shown in Table 6. The corresponding surfaces in the table are shown in FIG. 22. In the table, the surfaces marked with asterisks are aspherical, and aspherical coefficients are also shown. The expression representing an aspherical surface is the same as that of the first embodiment.

The lens having the thirteenth surface (r13) and the fourteenth surface (r14) is the condenser lens 57. Although not shown in FIG. 22, the condenser lenses 56 and 58 have the thirteenth and the fourteenth surfaces like the condenser lens 57.

Figure 25A:
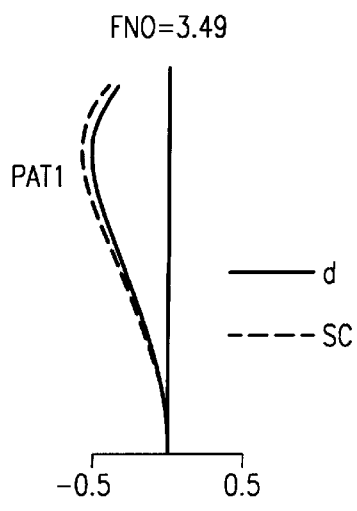
FIGS. 25A to 25C are graphic representations of aberrations of a projection optical system of the eighth embodiment.
Figure 25B:
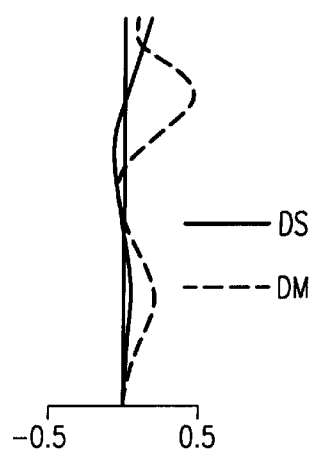
Figure 25C:

FIGS. 25A to 25C are graphic representations of aberrations of the projection optical system 85. In FIG. 25A showing spherical aberration, the solid line d represents spherical aberration to the d-line and the broken line SC represents sine condition. In FIG. 25B showing astigmatism, the solid line DS and the broken line DM represent astigmatisms of the sagittal luminous flux and the meridional luminous flux, respectively. In FIG. 25C, the solid line represents distortion. For simplicity, the decentering of the condenser lens is ignored and aberrations in axially symmetrical state are shown.

While the color separating and synthesizing prism 24 shown in FIG. 23 is used as the color separating and synthesizing means in this embodiment, the present invention can be achieved by a different structure. Hereinafter, embodiments having different color separating and synthesizing means will be shown as ninth to eleventh embodiments. In each of the embodiments, since the elements other than the color separating and synthesizing means are the same as those of the eighth embodiment, the same elements will not be described or shown in the figure.

<Ninth Embodiment>

Figure 26:
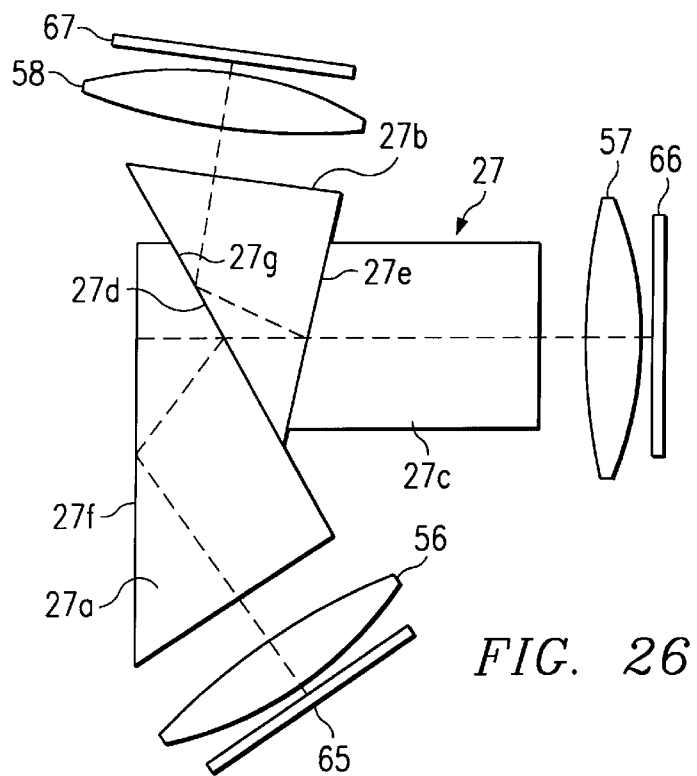
FIG. 26 is a horizontal cross-sectional view showing the structure of a color separating and synthesizing prism of a ninth embodiment.

FIG. 26 is a horizontal cross-sectional view showing the structure of the display apparatus of this embodiment (the projection optical system is not shown). As the color separating and synthesizing means, a color separating and synthesizing prism 27 is used comprising two hexahedral prisms 27a and 27c and one pentahedral prism 27b. The prisms 27b and 27c are cemented so as to form a joint surface 27e. The prism 27a is disposed so that a surface 27d is opposed to a surface 27g of the prism 27b with a slight air layer therebetween.

A dichroic multilayer film that reflects only the luminous flux of B and transmits the luminous fluxes of the other colors is deposited on the surface 27d. A dichroic multilayer film that reflects only the luminous flux of R and transmits the luminous fluxes of the other colors is deposited on the joint surface 27e. The angles of the surface 27d and the joint surface 27e to the axial principal ray are 27.9 degrees and 12.4 degrees, respectively, and both fulfill the condition 1b.

Of the illumination light incident on the surface 27f, the luminous flux of B is reflected at the surface 27d and is incident on the corresponding reflective LCD panel 65 after totally reflected at the surface 27f. The luminous flux of R is reflected at the joint surface 27e and is incident on the corresponding reflective LCD panel 67 after totally reflected at the surface 27g. The luminous flux of G passes through all the surfaces of the color separating and synthesizing prism 27 and is incident on the corresponding reflective LCD panel 66. Description of the projection light is omitted because the projection light can be explained by following the path of the illumination light in the opposite direction.

<Tenth Embodiment>

Figure 27:
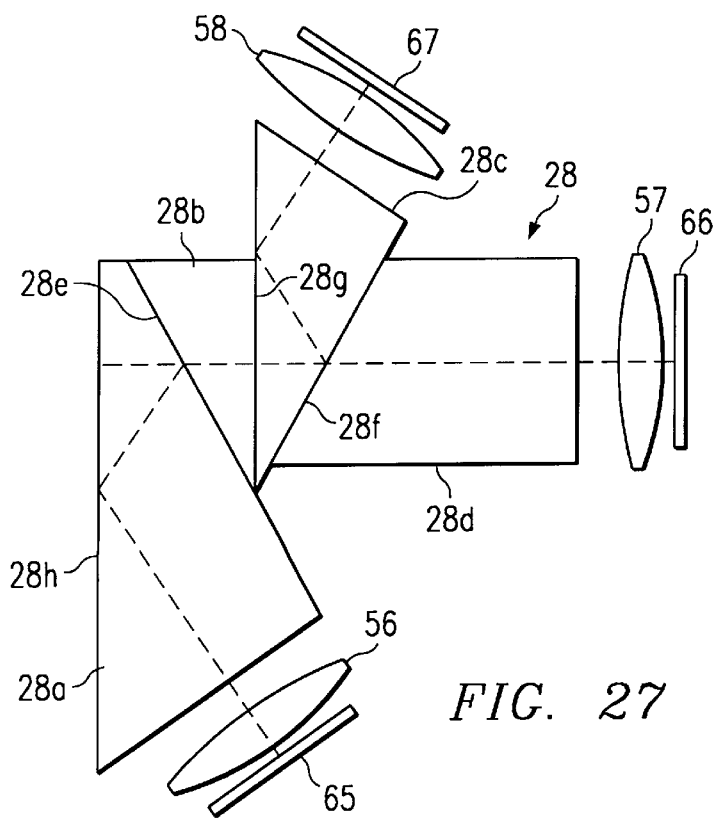
FIG. 27 is a horizontal cross-sectional view showing the structure of a color separating and synthesizing prism of a tenth embodiment.

FIG. 27 is a horizontal cross-sectional view showing the structure of the display apparatus of this embodiment (the projection optical system is not shown). As the color separating and synthesizing means, a color separating and synthesizing prism 28 is used comprising two hexahedral prisms 28a and 28d and two pentahedral prisms 28b and 28c. The four prisms 28a, 28b, 28c and 28d are cemented so that the prisms 28a and 28b form a joint surface 28e and the prisms 28c and 28d form a joint surface 28f. The prism 28b and the prism 28c are in a positional relationship such that a slight air layer is formed between the opposed surfaces thereof. Of the surfaces opposed with the air layer therebetween, the surface on the side of the prism 28c is referred to as surface 28g.

A dichroic multilayer film that reflects only the luminous flux of B and transmits the luminous fluxes of the other colors is deposited on the joint surface 28e. A dichroic multilayer film that reflects only the luminous flux of R and transmits the luminous fluxes of the other colors is deposited on the joint surface 28f. The angles of the joint surfaces 28e and 28f to the axial principal ray are 27.9 degrees and 27.9 degrees, respectively, and both fulfill the condition 1b.

Of the illumination light incident on the surface 28h, the luminous flux of B is reflected at the joint surface 28e and is incident on the corresponding reflective LCD panel 65 after totally reflected at the surface 28h. The luminous flux of R is reflected at the joint surface 28f and is incident on the corresponding reflective LCD panel 67 after totally reflected at the surface 28g. The luminous flux of G passes through all the surfaces of the color separating and synthesizing prism 28 and is incident on the corresponding reflective LCD panel 66. Description of the projection light is omitted because the projection light can be explained by following the path of the illumination light in the opposite direction.

<Eleventh Embodiment>

Figure 28:
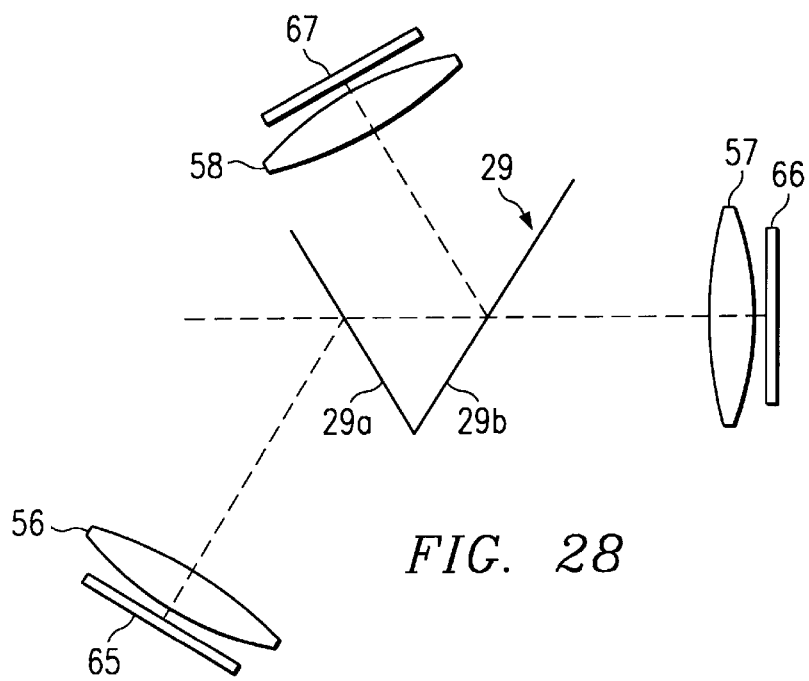
FIG. 28 is a horizontal cross-sectional view showing the structure of a color separating and synthesizing mirror of an eleventh embodiment.
Figure 30:
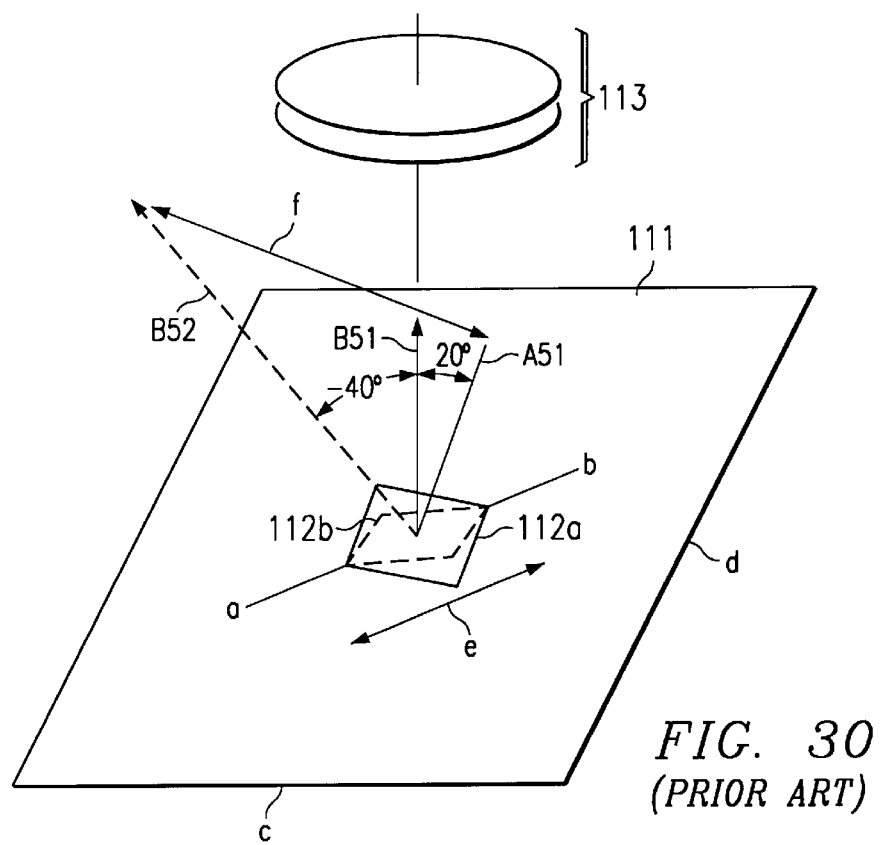
FIG. 30 is a perspective view showing the reflection image of the micromirror of the DMD.
Figure 29:
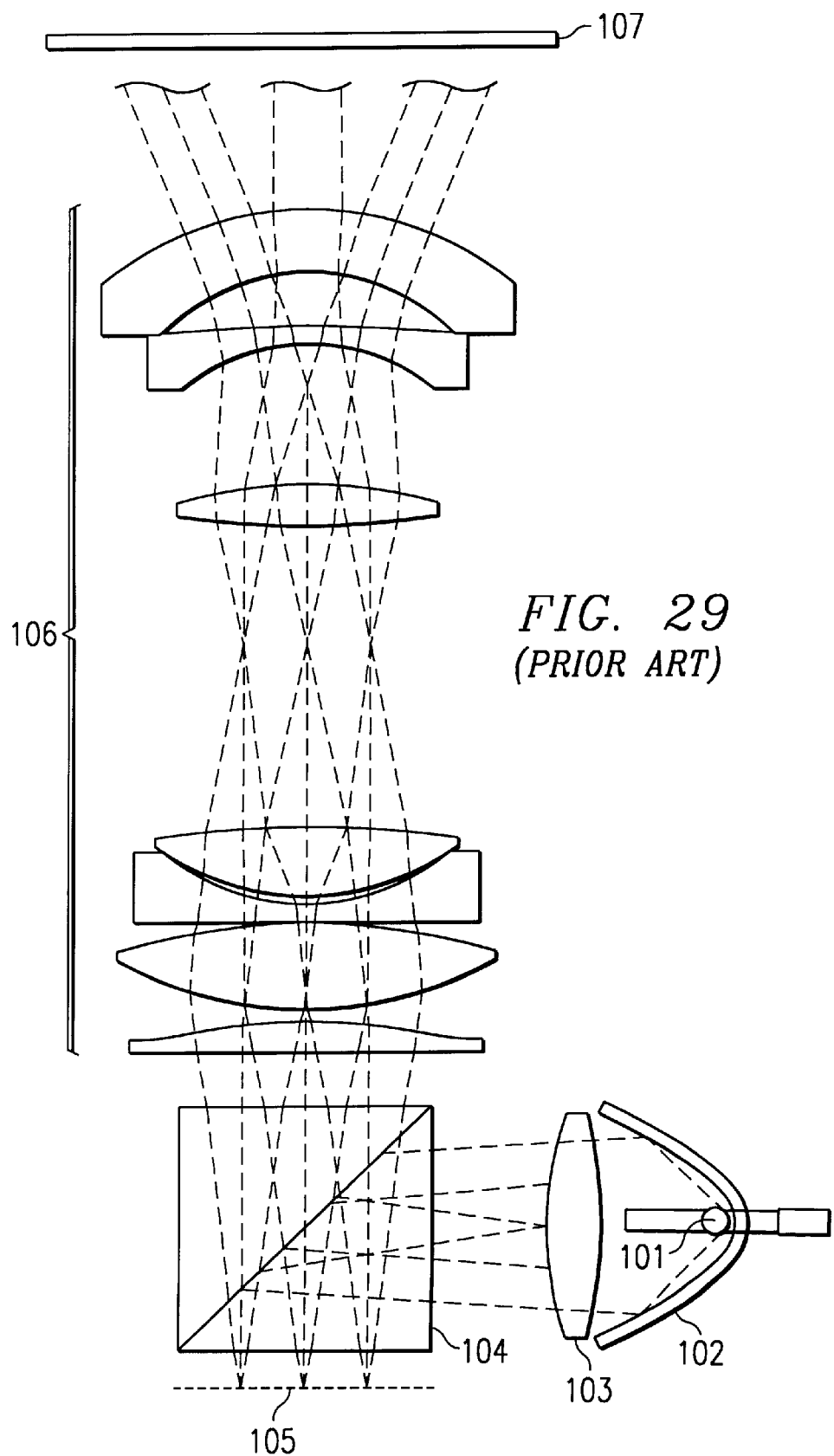
FIG. 29 is a view showing the structure of the conventional display apparatus.

FIG. 28 is a horizontal cross-sectional view showing the structure of the display apparatus of this embodiment (the projection optical system is not shown). The color separating and synthesizing means is a color separating and synthesizing mirror 29 comprising two dichroic mirrors 29a and 29b. A dichroic multilayer film is deposited on the surfaces of the two dichroic mirrors 29a and 29b on which the illumination light is incident.

A dichroic multilayer film that reflects only the luminous flux of B and transmits the luminous fluxes of the other colors is deposited on the dichroic mirror 29a. A dichroic multilayer film that reflects only the luminous flux of R and transmits the luminous fluxes of the other colors is deposited on the dichroic mirror 29b. The angles of the dichroic mirrors 29a and 29b to the axial principal ray are 30 degrees and 30 degrees, respectively, and both fulfill the condition 1b.

Of the illumination light, the luminous flux of B is reflected at the dichroic mirror 29a and is incident on the corresponding reflective LCD panel 65. The luminous flux of R is reflected at the dichroic mirror 29b and is incident on the corresponding reflective LCD panel 67. The luminous flux of G passes through the two dichroic mirrors 29a and 29b and is incident on the corresponding reflective LCD panel 66. Description of the projection light is omitted because the projection light can be explained by following the path of the illumination light in the opposite direction.

While the first to the eleventh embodiments are projectors for imaging the image on the reflective display panel on the screen as described above, the present invention is not limited to this, but may be, for example, a so-called view finder where the projection optical system is formed as an optical system for forming virtual images which are shown to the user.

Obviously, many modifications and variations of the present invention are possible in light of the above teachings. It is therefore to be understood that within the scope of the appended claims, the invention may be practiced other than as specifically described.

TABLE 1

| Surface No. | Radius of curvature | Axial distance | Refractive index to d-line | Abbe number |
|---|---|---|---|---|
| Object plane (Screen 9) | ∞ | | | |
| r 1 | 169.96419 | 845 | AIR | |
| *r 2 | 35.08970 | 10.000000 | 1.493000 | 58.3432 |
| r 3 | 116.64822 | 7.487588 | AIR | |
| r 4 | 35.94527 | 3.800000 | 1.754500 | 51.5700 |
| r 5 | 145.22633 | 7.220790 | AIR | |
| r 6 | 183.34358 | 10.000000 | 1.798500 | 22.6000 |
| r 7 | 1150.61590 | 50.427720 | AIR | |
| r 8 | −61.60857 | 7.976524 | 1.636072 | 31.0372 |
| Diaphragm 10 | ∞ | 27.350425 | AIR | |
| r 11 | 2064.89337 | 29.006144 | AIR | |
| r 12 | −29.69479 | 12.505885 | 1.509427 | 67.4374 |
| r 13 | −85.56005 | 3.893375 | 1.847209 | 25.5256 |
| r 14 | −150.33264 | 23.514512 | AIR | |
| r 15 | −52.79312 | 11.260397 | 1.505740 | 64.6729 |
| *r 16 | −188.19976 | 0.100000 | AIR | |
| r 17 | −51.15607 | 10.583298 | 1.493000 | 58.3432 |
| Image plane (LCD panel 6) | ∞ | 80.000179 | AIR | |

[Aspherical coefficients of 2nd surface (r2)]
  $\epsilon = 1.0$
  $A = -0.299686 \times 10^{-5}$
  $B = 0.276652 \times 10^{-9}$
  $C = 0.267340 \times 10^{-11}$
  $D = 0.000000$
[Aspherical coefficients of 16th surface (r16)]
  $\epsilon = 1.0$
  $A = 0.207988 \times 10^{-5}$
  $B = 0.260358 \times 10^{-10}$
  $C = 0.130976 \times 10^{-12}$
  $D = 0.000000$
[Expression representing aspherical surface]
$x = f(y, z) = cr^2/\{1 + (1 - \epsilon c^2 r^2)^{1/2}\} + Ar^4 + Br^6 + Cr^8 + Dr^{10}$
Here,
$r = (y^2 + z^2)^{1/2}$
$\epsilon$: conic constant
c: curvature (reciprocal of radius of curvature cr)

TABLE 2

| Surface No. | Radius of curvature | Axial distance | Refractive index to d-line | Abbe number |
|---|---|---|---|---|
| Object plane (Screen 9) | ∞ | | | |
| r 1 | 53.65689 | 845 | AIR | |
| *r 2 | 28.68577 | 10.000000 | 1.834387 | 41.4087 |
| r 3 | 214.83798 | 9.940042 | AIR | |
| r 4 | 32.58226 | 2.800000 | 1.710031 | 52.6428 |
| r 5 | 76.90179 | 24.060430 | AIR | |
| r 6 | −147.68450 | 6.751110 | 1.850000 | 40.0400 |
| Diaphragm 13 | ∞ | 20.100000 | AIR | |
| r 9 | 171.65358 | 31.638659 | AIR | |
| r 10 | −39.68992 | 12.054459 | 1.627529 | 57.2339 |
| r 11 | −35.01697 | 1.352800 | AIR | |
| r 12 | 1962.54668 | 2.800000 | 1.764543 | 24.2254 |
| r 13 | 108.99450 | 0.744422 | AIR | |
| r 14 | −62.87504 | 14.011345 | 1.708361 | 53.2669 |
| *r 15 | 84.33803 | 2.416859 | AIR | |
| r 16 | 746.33260 | 5.145542 | 1.493000 | 58.3432 |
| r 17 | ∞ | 8.959087 | AIR | |
| r 18 | ∞ | 41.225245 | 1.516800 | 64.1988 |
| Image plane (DMD 61) | ∞ | 5.999997 | AIR | |

[Aspherical coefficients of 2nd surface (r2)]
  $\epsilon = 1.000000$
  $A = -1.21996 \times 10^{-5}$
  $B = -0.788620 \times 10^{-8}$
  $C = 0.452734 \times 10^{-11}$
  $D = 0.281555 \times 10^{-14}$
  $E = -0.180179 \times 10^{-16}$
[Aspherical coefficients of 15th surface (r15)]
  $\epsilon = 1.000000$
  $A = -0.239194 \times 10^{-5}$
  $B = -0.523377 \times 10^{-9}$
  $C = 0.533220 \times 10^{-12}$
  $D = 0.000000$

TABLE 3

| Surface No. | Radius of curvature | Axial distance | Refractive index to d-line | Abbe number |
|---|---|---|---|---|
| Object plane (Screen 9) | ∞ | | | |
| r 1 | 169.96419 | 845 | AIR | |
| *r 2 | 35.08970 | 10.000000 | 1.493000 | 58.3432 |
| r 3 | 116.64822 | 7.487588 | AIR | |
| r 4 | 35.94527 | 3.800000 | 1.754500 | 51.5700 |
| r 5 | 145.22633 | 7.220790 | AIR | |
| r 6 | 183.34358 | 10.000000 | 1.798500 | 22.6000 |
| r 7 | 1150.61590 | 50.427720 | AIR | |
| r 8 | −61.60857 | 7.976524 | 1.636072 | 31.0372 |
| Diaphragm 15 | ∞ | 27.350425 | AIR | |
| r 11 | 2064.89337 | 29.006144 | AIR | |
| r 12 | −29.69479 | 12.505885 | 1.509427 | 67.4374 |
| r 13 | −85.56005 | 3.893375 | 1.847209 | 25.5256 |
| r 14 | −150.33264 | 23.514512 | AIR | |
| r 15 | −52.79312 | 11.260397 | 1.505740 | 64.6729 |
| *r 16 | −188.19976 | 0.100000 | AIR | |
| r 17 | −51.15607 | 10.583298 | 1.493000 | 58.3432 |
| Image plane (DMD 62) | ∞ | 80.000179 | AIR | |

[Aspherical coefficients of 2nd surface (r2)]
  $\epsilon = 1.0$
  $A = -0.299686 \times 10^{-5}$
  $B = -0.276652 \times 10^{-9}$
  $C = -0.267340 \times 10^{-11}$
  $D = 0.000000$
[Aspherical coefficients of 16th surface (r16)]
  $\epsilon = 1.0$
  $A = -0.207988 \times 10^{-5}$
  $B = 0.260358 \times 10^{-10}$
  $C = -0.130976 \times 10^{-12}$
  $D = 0.000000$

TABLE 4

| Surface No. | Radius of curvature | Axial distance | Refractive index to d-line | Abbe number |
|---|---|---|---|---|
| Object plane (Screen 9) | ∞ | | | |
| r 1 | 80.09806 | 845 | AIR | |
| r 2 | 30.57972 | 1.100000 | 1.516800 | 64.1191 |
| r 3 | 33.89259 | 8.582449 | AIR | |
| *r 4 | 18.95435 | 1.100000 | 1.492700 | 57.4912 |
| r 5 | 53.13865 | 91.656808 | AIR | |
| r 6 | 177.18527 | 6.608267 | 1.652240 | 44.9201 |
| Diaphragm 17 | ∞ | 46.022078 | AIR | |
| r 8 | 58.32102 | 8.151983 | AIR | |
| r 9 | −28.73219 | 5.807892 | 1.516800 | 64.1191 |
| r 10 | −74.45537 | 1.100000 | 1.755200 | 27.5822 |
| r 11 | 109.55466 | | AIR | |
| r 12 | −164.68135 | 8.978866 | 1.516800 | 65.2613 |
| Image plane (LCD panel 63) | ∞ | | AIR | |

[Aspherical coefficients of 4th surface (r4)]

TABLE 4-continued $\epsilon = 0.016404$
$A = 0.647162 \times 10^{-5}$
$B = -0.293621 \times 10^{-8}$
$C = 0.141308 \times 10^{-10}$
$D = 0.167644 \times 10^{-13}$
[Parallel decentering of 8th surface (r8)]
　0.301943
[Inclination decentering of 8th surface (r8)]
　0.623887°
[Vertex position of 11th surface (r11) relative to diaphragm surface]
　84.679785
[Parallel decentering of 11th surface (r11)]
　16.324282 = 1.48 H
[Inclination decentering of image plane (LCD panel 63)]
　−5.467717°
[Vertex position of image plane (LCD panel 63) relative to 10th surface]
　80.870644

TABLE 5

| Surface No. | Radius of curvature | Axial distance | Refractive index to d-line | Abbe number |
|---|---|---|---|---|
| Object plane (Screen 9) | ∞ | | | |
| r 1 | 42.2597 | 845 | AIR | |
| r 2 | 24.4074 | 4.54 | 1.51680 | 64.17 |
| r 3 | 29.5219 | 5.62 | AIR | |
| *r 4 | 13.8174 | 4.02 | 1.49270 | 57.49 |
| r 5 | 31.4622 | 34.95 | AIR | |
| r 6 | 166.3567 | 9.47 | 1.65224 | 44.92 |
| Diaphragm 18 | ∞ | 24.31 | AIR | |
| r 7 | 79.0620 | 1.18 | AIR | |
| r 8 | −13.6775 | 5.26 | 1.51680 | 64.17 |
| r 9 | −27.2685 | 4.35 | 1.75520 | 27.58 |
| r 10 | 125.0000 | 40.00 | AIR | |
| r 11 | −200.0000 | 12.00 | 1.51680 | 64.20 |
| Image plane (DMD 64) | ∞ | 0.29 | AIR | |

[Aspherical coefficients of 4th surface (r4)]
　$\epsilon = 0.2244$
　$A = 2.40543 \times 10^{-5}$
　$B = -1.11726 \times 10^{-7}$
　$C = 4.58245 \times 10^{-10}$
　$D = 6.78252 \times 10^{-13}$
[Parallel decentering of 10th surface (r10)]
　16 = 0.87 H
[Inclination decentering of image plane (DMD 64)]
　−3.2°

TABLE 6

| Surface No. | Radius of curvature | Axial distance | Refractive index to d-line | Abbe number |
|---|---|---|---|---|
| Projection plane | ∞ | | | |
| r 1 | 42.84830 | 845 | AIR | |
| r 2 | 26.50403 | 1.100000 | 1.754500 | 51.5700 |
| r 3 | 31.60111 | 8.873609 | AIR | |
| *r 4 | 18.35059 | 1.100000 | 1.670938 | 54.8859 |
| r 5 | 53.90145 | 64.008095 | AIR | |
| r 6 | 29.45774 | 3.171023 | 1.791571 | 22.8126 |
| Diaghragm 19 | ∞ | 35.881338 | AIR | |
| r 8 | 13.17508 | 12.869041 | AIR | |
| r 9 | 23.56948 | 7.218537 | 1.577914 | 60.6311 |
| r 10 | 43.69099 | 1.100000 | 1.846661 | 23.8234 |
| r 11 | ∞ | 0.100000 | AIR | |
| r 12 | ∞ | 90.000000 | 1.516800 | 65.2613 |
| r 13 | 59.89805 | 11.974200 | AIR | |
| r 14 | 90.60260 | 11.881196 | 1.516800 | 65.2613 |
| r 15 | ∞ | 1.909300 | AIR | |

TABLE 6-continued (Image plane)

[Aspherical coefficients of 4th surface (r4)]
　$\epsilon = 0.01640437$
　$A = 0.926527 \times 10^{-5}$
　$B = 0.143572 \times 10^{-7}$
　$C = 0.531059 \times 10^{-10}$
　$D = 0.715979 \times 10^{-13}$
[Size of reflective LCD panel]
　Long side: 35.84 mm
　Short side (Value of H): 21.5 mm
[Focal length (f) of projection optical system]
　28.6 mm
　(Condition 3 is fulfilled because y/tanθ/f = 3.53)
[Parallel decentering of 13th surface (r13)]
　13.907900 mm (in the direction of Y axis)
　(Condition 2b is fulfilled because 13.907900 = 0.647 H)
[Inclination decentering of image plane (r15)]
　5.341089°
　(Condition 4 is fulfilled)
[Angle of dichroic-coated surface to axial principal ray]
　Surface 24d: 27.9° (Condition 1b is fulfilled)
　Surface 24e: 32.1° (Condition 1 is fulfilled)

What is claimed is:

1. A display apparatus comprising:

an illumination optical system for emitting illumination light;

a reflective display panel divided into a plurality of pixels, said reflective display panel being illuminated by the illumination light from said illumination optical system and selectively reflecting the thus incident illumination light pixel by pixel as projection light;

a projection optical system for projecting image information from said reflective display panel onto a projection surface by using the projection light reflected by said reflective display panel; and a reflection angle converting optical system disposed ahead of said reflective display panel, wherein said reflection angle converting optical system is for causing an angle between an optical axis of the illumination light incident on said reflection angle converting optical system and an optical axis of the projection light transmitted by said reflection angle converting optical system to be less than an angle which would be achieved between an optical axis of the illumination light on the reflective display panel and an optical axis of the projection light without said reflection angle converting optical system.

2. A display apparatus as claimed in claim 1, wherein said reflection angle converting optical system further changes the angle of reflection of the projection light at said reflective display panel.

3. A display apparatus as claimed in claim 1, wherein said reflective display panel is a reflective liquid crystal display panel.

4. A display apparatus as claimed in claim 1, wherein said reflective display panel is a digital micromirror device in which a plurality of fine mirrors are rotated pixel by pixel.

5. A display apparatus as claimed in claim 1, wherein said reflection angle converting optical system includes a diffractive optical element.

6. A display apparatus as claimed in claim 5, wherein said diffractive optical element is of a blazed type.

7. A display apparatus as claimed in claim 1,
wherein said reflection angle converting optical system includes a wedge-shaped optical element having planes that are not parallel to each other.

8. A display apparatus as claimed in claim 1,
wherein said reflection angle converting optical system includes a condenser lens disposed so as to be decentered with respect to said projection optical system.

9. A display apparatus as claimed in claim 8, wherein said reflective display panel is disposed so that a center thereof substantially coincides with the optical axis of said projection optical system, and wherein an amount of decentering of said condenser lens with respect to the optical axis of said projection optical system is 0.5 H to 2.0 H when H is an image height of said reflective display panel in a direction of decentering.

10. A display apparatus as claimed in claim 1, wherein the angle between the optical axis of the illumination light and the optical axis of the projection optical system is in a range of 15 to 40 degrees.

11. A display apparatus as claimed in claim 1, wherein said reflective display panel is disposed so as to be inclined in a range of 2 to 8 degrees to the optical axis of said projection optical system.

12. A display apparatus comprising:
an illumination optical system for emitting illumination light;
a plurality of reflective display panels each divided into a plurality of pixels, each of said reflective display panels being illuminated by the illumination light and selectively reflecting the thus incident illumination light pixel by pixel as projection light;
a color separating and synthesizing system for separating the illumination light from said illumination optical system into light rays of a plurality of colors to illuminate the reflective display panels corresponding to the colors, said color separating and synthesizing system synthesizing light rays reflected by the reflective display panels;
a projection optical system for projecting image information from said reflective display panels onto a projection surface by using the projection light reflected by said reflective display panels; and
a reflection angle converting optical system disposed ahead of said plurality of reflective display panels,
wherein said reflection angle converting optical system is for causing an angle between an optical axis of the illumination light incident on said reflection angle converting optical system and an optical axis of the projection light transmitted by said reflection angle converting optical system to be less than an angle which would be achieved between an optical axis of the illumination light on the reflective display panel and an optical axis of the projection light without said reflection angle converting optical system, and for changing an angle between the optical axis of the illumination light and the optical axis of the projection optical system so that the angle varies continuously according to areas of said reflective display panels to be illuminated.

13. A display apparatus as claimed in claim 12,
wherein said color separating and synthesizing system includes a plurality of dichroic-coated surfaces, and wherein angles between the dichroic-coated surfaces and optical axes of said projection optical system are not more than 35 degrees.

14. A display apparatus as claimed in claim 12, wherein when a focal length of said projection optical system is f, an image height of a most off-axial ray on any of said reflective display panels is y and an angle between a principal ray of the most off-axial ray and an axial principal ray of the projection light incident on said projection optical system is θ, the following condition is fulfilled:

$2 < y/\tan θ/f < 10$.

15. A display apparatus as claimed in claim 12, wherein a plane including the optical axes of said illumination optical system and said projection optical system is perpendicular to a plane including the projection light rays of the colors having been synthesized, an optical path of said projection light rays being the optical axis of the projection optical system after synthesis.

16. A display apparatus as claimed in claim 12, wherein said reflective display panels are rectangular and short sides thereof are parallel to a plane including optical axes of said illumination optical system and said projection optical system.

17. A display apparatus as claimed in claim 12, wherein said reflective display panels are reflective liquid crystal display panels.

18. A display apparatus as claimed in claim 12, wherein said reflection angle converting system includes a plurality of condenser lenses disposed so as to be decentered with respect to an optical path of the projection light before synthesis whose optical path after synthesis is the optical axis of said projection optical system.

19. A display apparatus as claimed in claim 18, wherein each of said reflective display panels is disposed so that a center thereof substantially coincides with the optical path of the projection light before synthesis and whose optical path after synthesis is the optical axis of said projection optical system, and wherein an amount of decentering of said condenser lenses with respect to the optical path of the projection light before synthesis, whose optical path after synthesis is the optical axis of said projection optical system, is 0.3 H to 2.0 H where H is an image height of the corresponding reflective display panel in a direction of decentering.

20. A display apparatus comprising:
an illumination optical system for emitting illumination light;
a reflective display panel divided into a plurality of pixels, said reflective display panel being illuminated by the illumination light from said illumination optical system and selectively reflecting the thus incident illumination light pixel by pixel as projection light;
a projection optical system for projecting image information from said reflective display panel onto a projection surface by using the projection light reflected by said reflective display panel; and
a reflection angle converting optical system disposed between said illumination optical system and said reflective display panel,
wherein said reflection angle converting optical system is for causing an angle between an optical axis of the illumination light incident on said reflection angle converting optical system and an optical axis of the projection light transmitted by said reflection angle converting optical system to be less than an angle which would be achieved between an optical axis of the illumination light on the reflective display panel and an optical axis of the projection light without said reflection angle converting optical system, said reflection angle converting optical system including an optical element selected from the group consisting of a diffractive optical element, a wedge shaped optical element, and a condenser lens.

21. A display apparatus as claimed in claim 20, wherein said reflective display panel is a reflective liquid crystal display panel.

22. A display apparatus as claimed in claim 20, wherein said reflective display panel is a digital micromirror device.

23. A display apparatus as claimed in claim 20, wherein said reflection angle converting optical system includes a diffractive optical element.

24. A display apparatus as claimed in claim 23, wherein said diffractive optical element is of a blazed type.

25. A display apparatus as claimed in claim 20, wherein said reflection angle converting optical system includes a wedge-shaped optical element having opposing faces that are not parallel to each other.

26. A display apparatus as claimed in claim 20, wherein said reflection angle converting optical system includes a condenser lens disposed so as to be decentered with respect to the optical axis of said projection optical system.

27. A display apparatus as claimed in claim 26, wherein said reflective display panel is disposed so that a center thereof substantially coincides with the optical axis of said projection optical system, and wherein an amount of decentering of said condenser lens with respect to the optical axis of said projection optical system is between approximately 0.5 H to approximately 2.0 H, where H is an image height of said reflective display panel in a direction of decentering.

28. A display apparatus as claimed in claim 20, wherein the angle between the optical axis of the illumination light and the optical axis of the projection optical system is in a range of 15 to 40 degrees.

29. A display apparatus as claimed in claim 20, wherein said reflective display panel is disposed so as to be inclined in a range of 2 to 8 degrees to the optical axis of said projection optical system.

30. A display apparatus comprising:
an illumination optical system for emitting illumination light;
a reflective display panel divided into a plurality of pixels, said reflective display panel being illuminated by the illumination light from said illumination optical system and selectively reflecting the thus incident illumination light pixel by pixel as projection light;
a projection optical system for projecting image information from said reflective display panel onto a projection surface by using the projection light reflected by said reflective display panel; and
a reflection angle converting optical system for causing an angle between an optical axis of the illumination light incident on said reflection angle converting optical system and an optical axis of the projection light transmitted by said reflection angle converting optical system to be less than an angle which would be achieved between an optical axis of the illumination light on the reflective display panel and an optical axis of the projection light without said reflection angle converting optical system.

31. A display apparatus in accordance with claim 30, wherein said reflective display panel is a reflective liquid crystal display panel, and wherein said reflection angle converting optical system is formed by a reflecting surface of said reflective liquid crystal display, said reflecting surface being a diffraction grating.

32. A display apparatus in accordance with claim 31, wherein said diffraction grating is a blazed diffraction grating.

33. A display apparatus comprising:
an illumination optical system for emitting illumination light;
a reflective display panel divided into a plurality of pixels, said reflective display panel being illuminated by the illumination light from said illumination optical system and selectively reflecting the thus incident illumination light pixel by pixel as projection light;
a projection optical system for projecting image information from said reflective display panel onto a projection surface by using the projection light reflected by said reflective display panel; and
a reflection angle converting optical system disposed ahead of said reflective display panel,
wherein said reflection angle converting optical system is for causing an angle between an optical axis of the illumination light incident on said reflection angle converting optical system and an axis normal to the surface of said reflective display panel to be not equal in magnitude and opposite in sign to an angle between an optical axis of the projection light transmitted by said reflection angle converting optical system and the axis normal to the surface of said reflective display, and
wherein the reflection angle converting optical system includes a diffractive optical element.

34. A display apparatus as claimed in claim 33, wherein when a focal length of said projection optical system is f, an image height of a most off-axial ray on said reflective display panel is y and an angle between a principal ray of the most off-axial ray and an axial principal ray of the projection light incident on said projection optical system is θ, the following condition is fulfilled:

$$2 < y/\tan\theta/f < 10.$$

35. A display apparatus comprising:
an illumination optical system for emitting illumination light;
a reflective display panel divided into a plurality of pixels, said reflective display panel being illuminated by the illumination light from said illumination optical system and selectively reflecting the thus incident illumination light pixel by pixel as projection light;
a projection optical system for projecting image information formed by the projection light from said reflective display panel onto a projection surface; and
a reflection angle converting optical system disposed ahead of said reflective display panel,
wherein said reflection angle converting optical system is for continuously varying an angle of incidence of the illumination light on said reflective display panel as a function of illuminated position on said reflective display panel.

36. A display apparatus as claimed in claim 35, wherein said reflection angle converting optical system includes a diffractive optical element.

37. A display apparatus as claimed in claim 35, wherein said reflection angle converting optical system includes a condenser lens disposed so as to be decentered with respect to the optical axis of said projection optical system.

38. A display apparatus as claimed in claim 35, wherein when a focal length of said projection optical system is f, an image height of a most off-axial ray on said reflective display panel is y and an angle between a principal ray of the most off-axial ray and an axial principal ray of the projection light incident on said projection optical system is θ, the following condition is fulfilled:

$$2 < y/\tan\theta/f < 10.$$

* * * * *